United States Patent
Ishida et al.

(10) Patent No.: US 6,555,197 B1
(45) Date of Patent: Apr. 29, 2003

(54) LUBRICANT, MAGNETIC DISK AND MAGNETIC DISK APPARATUS

(75) Inventors: Mina Ishida, Hitachi (JP); Takayuki Nakakawaji, Kitaibaraki (JP); Yutaka Ito, Takahagi (JP); Hiroyuki Matsumoto, Chigasaki (JP); Hiroshi Tani, Ninomiya-machi (JP); Heigo Ishihara, Hinode-machi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/561,216

(22) Filed: Apr. 28, 2000

(30) Foreign Application Priority Data

Apr. 30, 1999 (JP) .......................... 11-125022
Nov. 30, 1999 (JP) .......................... 11-339288

(51) Int. Cl.$^7$ ............................................. G11B 5/725
(52) U.S. Cl. ................. 428/65.8; 428/421; 428/694 TF
(58) Field of Search ............................. 428/65.8, 421, 428/694 TF, 900

(56) References Cited

U.S. PATENT DOCUMENTS

| | | | | |
|---|---|---|---|---|
| 5,292,585 A | * | 3/1994 | Ohnuki et al. | 428/336 |
| 5,562,965 A | * | 10/1996 | Gui et al. | 428/65.4 |
| 6,099,937 A | * | 8/2000 | Gui et al. | 428/141 |
| 6,190,749 B1 | * | 2/2001 | Stirniman et al. | 428/64.1 |

* cited by examiner

*Primary Examiner*—Stevan A. Resan
(74) *Attorney, Agent, or Firm*—Antonelli, Terry, Stout, & Kraus, LLP

(57) ABSTRACT

A lubricant which does not splash easily and has an improved property of slidableness, and a magnetic disk using the lubricant are provided. A magnetic disk apparatus featuring a prolonged service life of a stable operation and an excellent record reproduction property is provided by installing the above magnetic disk. The lubricant of the invention contains perfluoropolyether expressed by the following general formula, in which a component of its molecular weights less than 1000 is smaller than 10 wt. %, a component of its molecular weights not less than 7000 is smaller than 15 wt. %, a ratio between a weight average molecular weight and a numeric average molecular weight is 1.5 or less, and a substitution ratio of its terminal functional group is not less than 90%:

$$R_1-CF_2O-[-(CF_2CF_2O)-_m-(CF_2O)-_n-]-CF_2-R_2 \quad (1),$$

where R1 and R2 are univalent organic groups, m and n are positive integers. Further for the magnetic disk which rotates at a speed of 10000 rpm or more, a lubricant containing a perfluoropolyether expressed by the following general formula is used, in which its numeric average molecular weight is not less than 5500, a component of molecular weights less than 3000 is 15 wt. % or less, a ratio between its weight average molecular weight and its numeric average molecular weight is 1.5 or less, and a substitution ratio of its terminal functional group is not less than 90%:

$$HOCH_2-CF_2O-[-CF_2CF_2O]-_m-[CF_2O]-_n-CF_2-CH_2OH \quad (2),$$

where m and n are positive integers.

22 Claims, 9 Drawing Sheets

LUBRICANT, MAGNETIC DISK AND MAGNETIC DISK APPARATUS

BACKGROUND OF THE INVENTION

When a magnetic disk is rotated at a high speed, a lubricant of a lubrication film formed on a surface of the magnetic disk tends to be splashed easily by a shearing force caused by air and a centrifugal force thereof.

As prior art for increasing molecular weights of lubricants, methods for removing low molecular weight components and impurities by solvent extraction are disclosed in JP No.267707, JP-A Nos. 4-31005, 5-20673, 5-234066, 5-109053, 6-215347, 7-141644, 9-291296, 9-157674, and 10-53781.

Lubricants that have been polymerized to have a high molecular weight by the solvent extraction method described in JP No.2677074, however, have such a problem that a substitution ratio of its end-group's function group drops depending on its type of lubricants, and as a result, a quantity of splash of its lubricants cannot be reduced.

Further, in order to enable a molecular weight control of a substantial amount of lubricants for industrial use by means of a splitter liquid chromatography, gel permeation chromatography, or evaporation method, provision of large-scaled facilities is required, which is economically disadvantageous.

SUMMARY OF THE INVENTION

The present invention relates to lubricants to be coated on a magnetic disk, such a magnetic disk, and a magnetic disk apparatus using the same.

For magnetic disks now available on the market, perfluoropolyether lubricants having a numeric average molecular weight from 2000 to 6000 are widely used. For example, Fomblin Z-DOL (trademark), Fomblin AM2001 (AUSIMONT S.p.A) the like are known. These perfluoropolyether lubricants available on the market have a molecular weight distribution from about several hundreds to 15000. Components of the lubricants easily spin out by a shearing force caused by high speed rotation or by a temperature rise in the apparatus are those with a low molecular weight smaller than about 2000. Therefore, in order to minimize splashing of lubricants, it is necessary to use a lubricant from which a low molecular weight component that is easily to spin out is removed in advance prior to its use for forming a lubricant film on the surface of a magnetic disk.

Further, in views of reliability in slidableness property of the magnetic disk, it is necessary to remove a certain amount of high molecular weight composition on the high molecular weight side as well. With a decrease in floating level, a magnetic head slider tends to make a contact slide during a seek time, thereby easily allowing lubricants present on a disk surface to be collected at a slider portion of the slider. If a viscosity of the lubricants collected (of a high molecular weight) becomes higher, its sticktion becomes stronger. Therefore, both components of one having a low molecular weight that is easily splashed and of the other one having a high molecular weight that results in a strong stickiness must be removed.

Further, even if its average molecular weight and molecular weight distribution of the lubricant are controlled as described above, a quantity of splash cannot be reduced because a substitution ratio of an end-group's functional group that secures an adsorption force of the lubricant is decreased by the solvent extraction method and the like. Therefore, while controlling the average molecular weight and molecular weight distribution such that the splash of the lubricant is minimized, it is also required at the same time to prevent a drop in the substitution ratio of the end function group.

An object of the invention is to provide for a lubricant that has a high substitution ratio for its end function group, a magnetic disk that has a minimum quantity of splash of the lubricant and has an improved reliability of slidableness, and also a magnetic disk apparatus using same.

A lubricant according to the invention is a perfluoropolyether expressed by the following formula (1), in which a component of molecular weights less than 1000 is 10 weight % or less, a component of molecular weights above 7000 is 15 weight % or less, and their molecular weights are controlled such that a ratio between a weight average molecular weight and a numeric average molecular weight becomes 1.5 or less, and a substitution ratio of its terminal functional group becomes more than 90%.

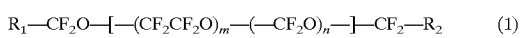

where, R1 and R2 are univalent organic groups, and m and n are positive integers.

Structural formula (1) may also be perfluoropolyether having structural formulas of (2) or (3) below.

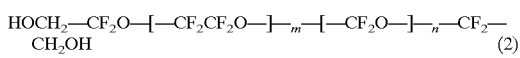

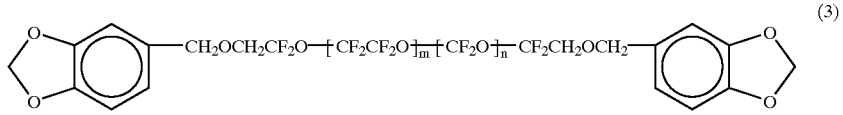

where m and n are positive integers.

Further, another lubricant according to the invention is a perfluoropolyether expressed by the following formula (2), in which its molecular weight is controlled such that a numeric average molecular weight is not less than 5500, a composition of a molecular weight of smaller than 3000 is 15 weight % or less, a ratio between a weight average molecular weight and a numeric average molecular weight is less than 1.5, and a substitution ratio of its end function group is not less than 90%.

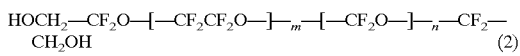

where, m and n are positive integers.

A Method of Controlling Molecular Weights of Lubricants:

According to the invention, an average molecular weight and molecular weight distribution of a lubricant are controlled using a ultra filtration method. According to this ultra filtration method, without need of a large-scaled facilities, a lubricant solution can be divided into a prescribed molecular weight simply by filtering and circulating through ultrafilter at a constant pressure and flow rate.

More specifically, a solution of perfluoropolyether dissolved in a fluorine-containing solvent is circulated through a ultrafilter made of polyethersulfone film having uniform pores under a constant pressure so that the lubricant is divided into a group of molecular sizes that passes through the pores and into another group of molecular sizes that does not pass through the pores.

Various films having a various pore size are available for use as the ultrafilter, therefore, by combining some of them, it becomes possible easily to control and obtain an appropriate average molecular weight and molecular weight distribution as desired. By the way, the ultrafilter film made of polyethersulfone used in the invention is a hydrophilic film. Generally speaking, it is substantially difficult for a hydrophilic film to permeate a hydrophobic substance such as a perfluoropolyether lubricant that contains fluorine element at a high concentration, fluorine containing solvents and the like.

However, it is enabled according to the invention to allow for the hydrophilic ultrafilter to permeate a hydrophobic substance. Firstly, a pure water is permeated through the ultrafilter made of polyethersulfone. A main object of this operation is to allow for water molecules to adsorb on the surface of the ultrafilter.

Then, a mixture of solvents of a fluorine-containing solvent and an alcohol solvent is circulated through the surface of the ultrafilter under application of a pressure. As its fluorine-containing solvent, a hydrofluoroether group solvent such as HFE-7100, HFE-7200 etc. that are compatible with alcohol solvents, or hydrofluorocarbon group solvents such as Bartlel XF etc. are used. As the alcohol group solvent, preferably, methylalcohol, ethylalcohol, isopropylalcohol and the like that can mix easily with the above-mentioned hydrofluoroether group solvent, hydrofluorocarbon group solvent or the like are used.

Through these operations according to the invention, water molecules present in the surface of the ultrafilter are substituted by alcohol, thereby modifying the surface of the ultrafilter film to have such a property, although it is inherently hydrophilic, that has affinity to a hydrophobic flurorine-containing solvent (such as hydrofluoroether group solvents) as well. Namely, the hydrofluoroether group solvents having no affinity to water molecules can be modified to be able to pass through the filter by substitution with alcohol that is hydrophilic and compatible with hydrofluoroether group solvents.

By way of example, it may be contemplated to circulate this mixture of solvents from the first stage, however, in order to ensure for alcohol molecules to be uniformly adsorbed, and to remove glyceline coated for prevention of drying of the polyethersulfone film, or to remove contaminations such as alkali ion metals and the like, flow of pure water prior to the mixture of solvents is preferred.

Types of Magnetic Disks:

According to the invention, lubricants are coated on the surfaces of two types of magnetic disks (type (a) and type (b)) to form a lubrication film thereon.

A magnetic disk 29 of type (a) has a structure, which is comprised of underlayer 24 made of Cr alloy formed on a glass substrate 23, magnetic layer 26 made of such as CoCrTaPt etc. formed thereon, protection film 27 having carbon mainly, and lubrication film 28 made of perfluoropolyether formed thereon as an outermost layer as shown in FIG. 4. In the magnetic disk of type (a), which is to be mounted on a load/unload type magnetic disk apparatus in which its magnetic head slider is present on its disk plane only during disk rotation, and is always evacuated out of the disk plane during disk stoppage, there is no need to take into account sticktion (sticking) between its magnetic disk and its magnetic head slider. Therefore, in the magnetic disk of type (a), there is no need to form bumps for prevention of sticktion on the disk surface, therefore, its disk surface is flat and smooth.

The magnetic disk of type (b) has a structure that is provided by forming: a NiP film and a Cr film sequentially on the surface of an aluminum alloy substrate as an underlayer 16; a magnetic layer 17 made of CoCrTaPt and the like thereon; a protection film 18 made mainly of carbon; and a lubrication film 19 made of perfluoropolyether as an outermost layer (see FIG. 2). Because this magnetic disk of type (b) is to be installed in a contact start stop type magnetic disk apparatus in which its magnetic head slider floats on the surface of the disk during disk rotation and stands by in contact with the surface of the disk during disk stoppage, it is required to take into account sticktion (sticking) between the disk and the magnetic head slider when starting the disk. Therefore, a plurality of ring-like bumps with a regularity are formed in a band with less than 5 mm width in an internal periphery portion with a radius of more than 10 mm and less than 25 mm, which will be referred to as a laser zone texture hereinafter. In this laser zone texture area, there occurs no strong sticktion. The magnetic head slider is ensured always to return to this laser zone texture area to stand by at the time when the disk is at rest.

The above two kinds of magnetic disks of type (a) and (b) are installed in two kinds of magnetic disk apparatuses of type (A) and (B), respectively.

In a magnetic disk apparatus of type (A), its magnetic head slider is of a load/unload type that evacuates the magnetic head slider out of the disk plane in the periphery of the disk at the time when the disk stops, and there is provided a ramp that supports a gimbal connected to the magnetic head slider at the time of evacuation thereof.

In a magnetic disk apparatus of type (B), its magnetic head slider is of a contact-start-stop type, in which the magnetic head slider floats on the surface of the disk during operation of the disk and stands by at rest in contact with the disk during disk stoppage.

BRIEF DESCRIPTION OF THE DRAWINGS

With reference to the accompanying drawing.

DETAILED DESCRIPTION OF THE INVENTION

In specimens 1–3 of each embodiment of the invention, there are used a perfluoropolyether lubricant having a structural formula of (2) or (3) that has 10 weight % or smaller of molecular weights of 1000 or less, and 15 weight % or more of molecular weights of not less than 7000, respectively, and a molecular weight distribution controlled at 1.5 or smaller.

Comparison specimens are provided as follows.

Specimen 4: which uses a lubricant having a structural formula of (2) or (3) in which a ratio of its molecular weight that is less than 1000 is 10 wt. % and a ratio of its molecular weight that is above 7000 is 15 wt. %, respectively, and its molecular weight distribution is larger than 1.5.

Specimen 5: which uses a lubricant having a structural formula of (2) or (3) in which only its low molecular weight side (molecular weights at 1000 or smaller) is controlled to be 10 wt. % or less.

Specimen 6: which uses a lubricant having a structural formula of (2) or (3) in which only its high molecular weight side molecular weights not less than 7000) is controlled to be 15 wt. % or less.

Specimens 7–10: using a lubricant having a structural formula of (2) or (3) in which the low molecular side is removed by a solvent extraction method.

EMBODIMENT 1

A Magnetic Disk Using a Lubricant of Structural Formula (2)

Figure 2:
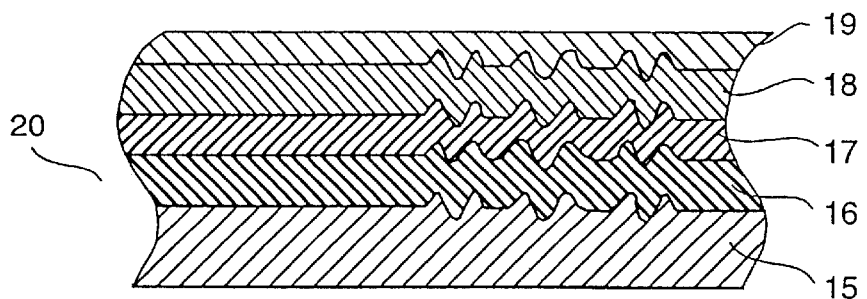
FIG. 2 is a cross-section of a magnetic disk of type (b) according to embodiments 1 and 2 of the invention.

A cross-sectional view of magnetic disk 20 according to embodiment 1 of the invention is indicated in FIG. 2. This magnetic disk 20 manufactured according to this embodiment of the invention is a magnetic disk of type (b) described above. On an aluminum alloy substrate 15, NIP plating film 16 is formed, and using a pulse laser (70 kHz, 1 W output), a plurality of bumps having a regularity are formed in the surface of NIP. Sequentially on substrate 15, there are formed Cr underlayer 16, magnetic film 17 made of a Co alloy, hard protection film 18 and lubrication film 19. Lubrication film 19 is provided by coating a perfluoropolyether lubricant approximately in 2 nm thick by a dip coating method of drain type.

Figure 1:
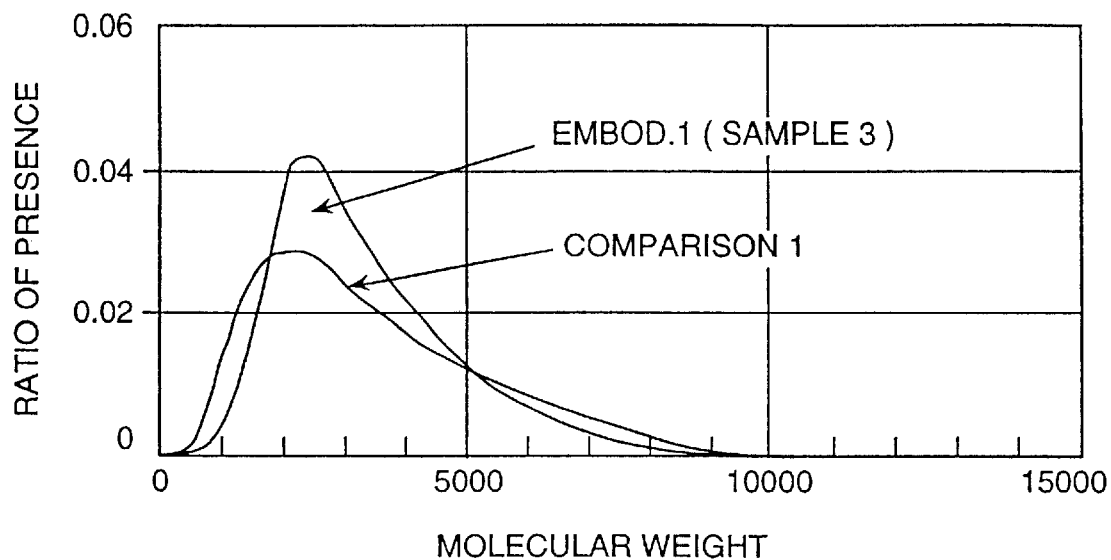
FIG. 1 is a diagram indicative of an example of measurements on molecular weight distributions by liquid chromatography according to embodiment 1 of the invention.

A numeric average molecular weight of the lubricant and a substitution ratio of a functional group in the end group are determined by analysis of fluorine by NMR method. Further, a ratio between a weight average molecular weight and a numeric average molecular weight (hereinafter referred to as a molecular weight distribution) is calculated by liquid chromatography. Examples of such measurements are indicated in FIG. 1.

Magnetic disk 20 according to embodiment 1 of the invention and a head are mounted in an abrasion measurement equipment of a pin-on-disk type, and a continual operation at a speed of 10000 rpm, 60° C. was conducted for 3000 hrs. After the operation, sticktion (sticking) between the head and the medium, and a reduced thickness of the lubrication film from its initial film thickness were measured. During the operation, the head moved in random in seek operation. A thickness of the lubrication films was measured using Fourier-Transform infrared spectrophotometer (FT-IR). Table 1 shows a result of measurements of sticktion after 3000 hrs operation and reduced thickness of lubrication films from their initial thickness.

TABLE 1

| SAMPLES | NUM. AVER. MOL. WEIGHT | SUB. RATIO OF END FUNC. GROUP | MOL. WEIGHT DISTR. MW/MN | RATIO OF MOL. WT. LESS THAN 1000 (%) | RATIO OF MOL. WT. ABOVE 7000 (%) | REDUCED FILM THICKNESS (NM) | STICKTION (GF) |
|---|---|---|---|---|---|---|---|
| 1 | 3030 | 96% | 1.48 | 9.8 | 14.8 | 0.07 | 3.12 |
| 2 | 3030 | 96% | 1.41 | 7.6 | 13.1 | 0.05 | 2.54 |
| 3 | 3020 | 96% | 1.34 | 6.2 | 12.3 | 0.01 | 1.03 |
| 4 (COMP. 1) | 2900 | 96% | 1.86 | 13.6 | 17.4 | 0.81 | 5.98 |
| 5 (COMP. 2) | 3000 | 96% | 1.68 | 9.8 | 18.2 | 0.09 | 6.21 |
| 6 (COMP. 3) | 3030 | 96% | 1.71 | 15.8 | 13.1 | 1.02 | 2.77 |
| 7 (COMP. 4) | 3010 | 85% | 1.23 | 7.5 | 7.9 | 1.08 | 5.36 |

In the case of comparison 1 (specimen 4), which uses a lubricant having a structural formula of (2) or (3) in which a ratio of its molecular weight that is less than 1000 is 10 wt. % and a ratio of its molecular weight that is above 7000 is 15 wt. %, respectively, and its molecular weight distribution is larger than 1.5, a decrease in the thickness of the lubrication film and its sticktion are higher than those of the embodiment 1 of the invention. In the case of comparison 2 (specimen 5), in which only the low molecular weight side (molecular weight at 1000 or less) is controlled to be 10 wt. % or less, there was no significant difference in the decreases of the film thickness (or splash of lubricant) from that of embodiment 1 of the invention, however, its sticktion did not drop as low as that of the embodiment of the invention. In contrast, in the case of comparison 3 (specimen 6) in which only the high molecular weight side (molecular weights not less than 7000) is controlled to be 15 wt. % or less, although there was no significant difference in its sticktion from that of the embodiment of the invention, a decrease in the film thickness (splash of lubricant) did not drop as low as that of the embodiment 1 of the invention. In the case of comparison 4 (specimen 7) in which the low molecular weight side is removed by the solvent extraction method, the substitution ratio dropped to about 85%, and its decrease in the film thickness and sticktion became larger than those of the embodiment of the invention.

Therefore, from the comparison between comparison specimens 4–6 and embodiments of the invention (specimens 1–3), it is clearly understood that a highly reliable information recording/reproducing medium can be obtained by controlling both the low molecular weight and the high molecular weight to balance appropriately, namely, by controlling such that its low molecular weight less than 1000 is 10 wt. % or less, and its high molecular weight not less than 7000 is 15 wt. % or less. Further, from comparison between specimen 7 and the embodiment of the invention, it is clearly understood that because the embodiment of the invention can maintain the substitution ratio of the function group in the end-group at a higher value (more than 90%), both a quantity of splashing of the lubricant and the sticking can be minimized.

EMBODIMENT 2

A Magnetic Disk Using a Lubricant Having Structural Formula (3)

A magnetic disk according to embodiment 2 of the invention uses a perfluoropolyether lubricant having a structural formula (3). The same test and evaluation as that of embodiment 1 was applied to the magnetic disk according to embodiment 2 of the invention. A result of such evaluation is shown in Table 2.

Also, in the case in which the perfluoropolyehter lubricant having the structural formula (3) was used, it is understood that an information recording/reproducing medium featuring reduced splashing and sticktion can be obtained by controlling both its low molecular weight and high molecular weight to be balanced appropriately likewise in the embodiment 1 of the invention. Further, according to this embodiment 2 of the invention, because its substitution ratio of the functional group in the end-group can be maintained at a high value, it is known that both a quantity of splash of the lubricant and its sticktion can be minimized.

EMBODIMENT 3

A Magnetic Disk Apparatus Using a Lubricant Having Structural Formula (2)

Figure 5:
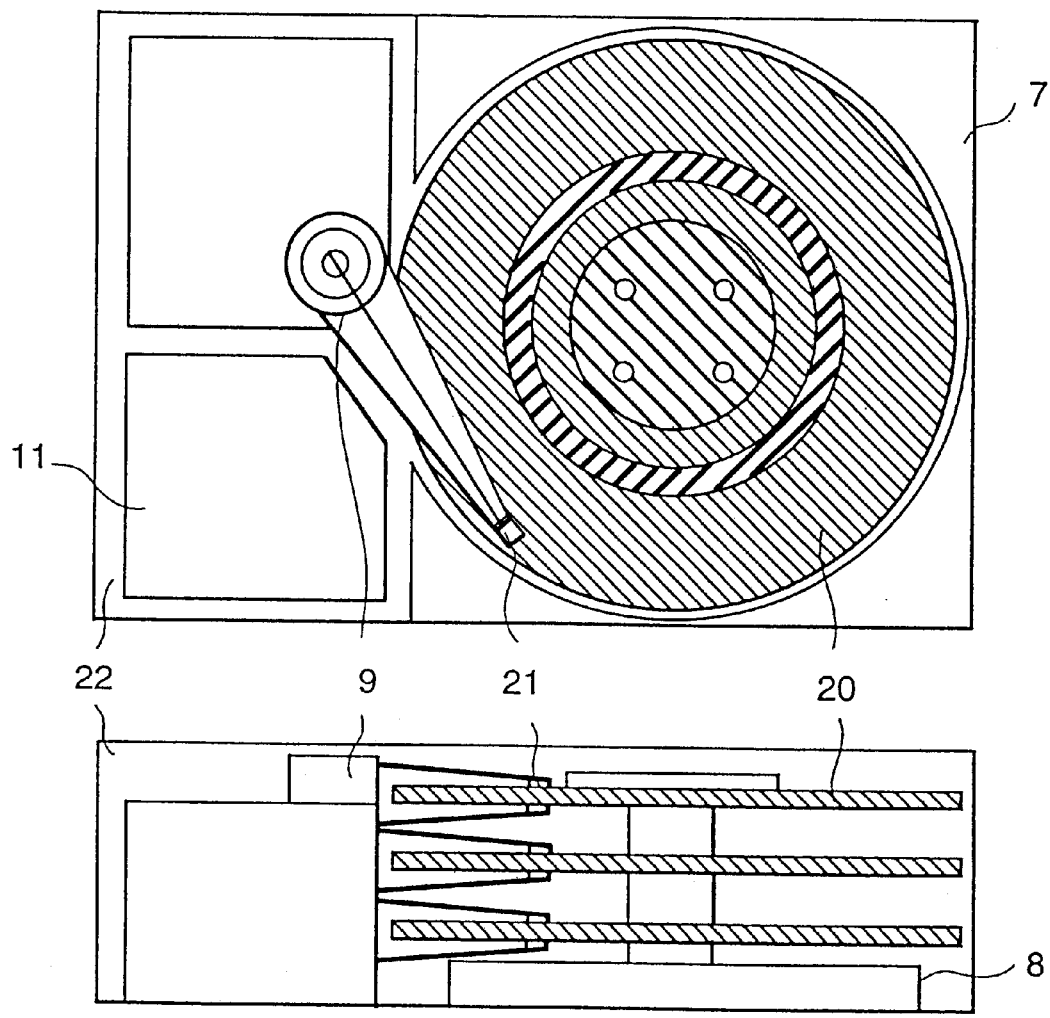
FIG. 5 is a plan view and a side view of a magnetic disk apparatus of type (B) according to embodiments 3 and 4 of the invention.

A plan view and a side view of a magnetic disk apparatus according to embodiment 3 of the invention are shown in FIG. 5. The magnetic disk apparatus according to this embodiment of the invention is a magnetic disk apparatus of type (B), in which magnetic disk 20 according to embodiment 1 (type (b)) of the invention is mounted.

Magnetic disk 20 is mounted on a spindle motor, and thereby a magnetic disk apparatus 22 is manufactured, which comprises housing 7, spindle motor 8, actuator 9, magnetic head slider 21, and control circuit 11, and which was subjected to a continuous operation at a speed of 10000 rpm and 60° C. for 3000 hrs. During the operation, the head is operated to seek in random. After the operation for 3000 hrs, the apparatus was stopped and held at rest for 6 hrs, then restarted its operation. Each sticktion and the number of errors per magnetic disk occurred in record reproduction after restarting of the magnetic disk are shown in Table 3.

TABLE 2

| SAMPLES | NUM. AVER. MOL. WEIGHT | SUB. RATIO OF END FUNC. GROUP | MOL. WEIGHT DISTR. MW/MN | RATIO OF MOL. WT. LESS THAN 1000 (%) | RATIO OF MOL. WT. ABOVE 7000 (%) | REDUCED FILM THICKNESS (NM) | STICKTION (GF) |
|---|---|---|---|---|---|---|---|
| 1 | 3300 | 92% | 1.46 | 9.4 | 14.6 | 0.13 | 4.51 |
| 2 | 3250 | 92% | 1.38 | 6.3 | 13.0 | 0.05 | 4.13 |
| 3 | 3220 | 92% | 1.28 | 5.8 | 11.9 | 0.02 | 2.30 |
| 4 (COMP. 5) | 3200 | 92% | 1.58 | 12.9 | 16.8 | 0.88 | 8.41 |
| 5 (COMP. 6) | 3240 | 92% | 1.63 | 9.1 | 17.9 | 0.11 | 8.66 |
| 6 (COMP. 7) | 3300 | 92% | 1.66 | 15.4 | 13.0 | 1.04 | 4.02 |
| 7 (COMP. 8) | 3200 | 86% | 1.24 | 7.7 | 8.4 | 1.16 | 7.84 |

TABLE 3

| SAMPLES | NUM. AVER. MOL. WEIGHT | SUB. RATIO OF END FUNC. GROUP | MOL. WEIGHT DISTR. MW/MN | RATIO OF MOL. WT. LESS THAN 1000 (%) | RATIO OF MOL. WT. ABOVE 7000 (%) | STICKTION (GF) | NO. OF ERRORS IN REPRODUCTION |
|---|---|---|---|---|---|---|---|
| 1 | 3030 | 96% | 1.48 | 9.8 | 14.8 | 3.09 | 11 |
| 2 | 3030 | 96% | 1.41 | 7.6 | 13.1 | 2.38 | 10 |
| 3 | 3020 | 96% | 1.34 | 6.2 | 12.3 | 1.00 | 4 |
| 4 (COMP. 9) | 2900 | 96% | 1.86 | 13.6 | 17.4 | 5.64 | 16 |
| 5 (COMP. 10) | 3000 | 96% | 1.68 | 9.8 | 18.2 | 5.99 | 10 |
| 6 (COMP. 11) | 3030 | 96% | 1.71 | 15.8 | 13.1 | 2.70 | 25 |
| 7 (COMP. 12) | 3010 | 85% | 1.23 | 7.5 | 7.9 | 5.28 | 13 |

From comparison between comparison specimens 4–6 and specimens 1–3 of embodiment 3 of the invention, it is clearly understood that those of embodiment 3 of the invention in which both sides of the low molecular weights and the high molecular weights are controlled to balance appropriately have a reduced sticktion and a reduced number of errors in record reproduction, thereby providing for a magnetic disk apparatus featuring a minimized sticktion and occurrence of errors in record reproduction. Further, from comparison between specimen 7 and those of embodiment 3 of the invention, it is known that because a high substitution ratio of the functional group in the end-group can be maintained according to embodiment 3, both of the sticktion and the number of errors in record reproduction can be minimized.

EMBODIMENT 4

A Magnetic Disk Apparatus Using a Lubricant Having a Structural Formula (3)

A magnetic disk apparatus according to embodiment 4 of the invention is similar to a magnetic disk apparatus of type (B), in which a magnetic disk of type (b) according to embodiment 2 of the invention is installed. For the magnetic disk of embodiment 2 of the invention, perfluoro polyether lubricant of structural formula (3) is used. The same test and evaluation were conducted on the magnetic disk apparatus according to this embodiment as done on the embodiment 3 of the invention. A result of evaluations is shown in Table 4.

When the perfluoropolyether lubricant having structural formula (3) was used by controlling both of its low molecular weights and it high molecular weights to be balanced appropriately as done in the embodiment 1 of the invention, a highly reliable magnetic disk apparatus ensuring a normal operation to be maintained (with reduced sticktion at starting) and a minimized number of errors in record reproduction is provided. Further, it is known that because a high level of substitution ratio of the functional group in the end-group can be retained according to this embodiment of the invention, both the sticktion and the number of errors in record reproduction can be reduced at the same time.

EMBODIMENT 5

A Magnetic Disk Using a Lubricant Having Structural Formula (2)

Figure 4:
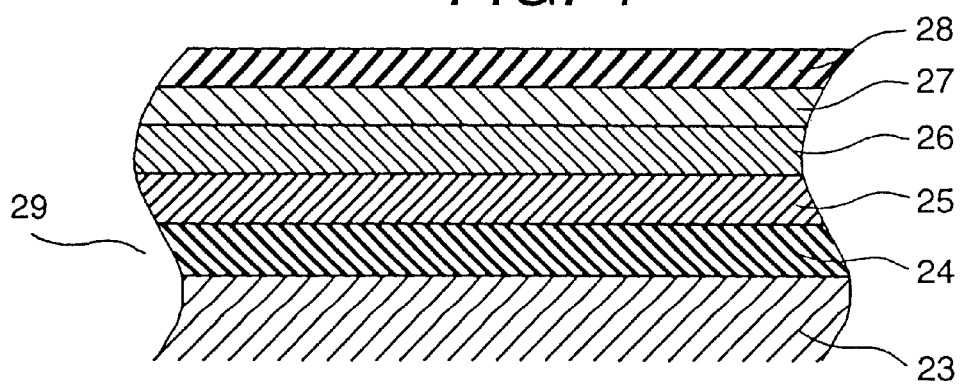
FIG. 4 is a cross-section of a magnetic disk of type (b) according to embodiments 5 and 6 of the invention.

A cross-section of magnetic disk 29 according to embodiment 5 of the invention is shown in FIG. 4. Magnetic disk 29 of this embodiment is a magnetic disk of type (a). A lubrication film 28 is a perfluoropolyether lubricant of structural formula (2),which iscoated approximately 2 nm thick by a dip method of a drain type.

Magnetic disk 29 with lubrication film 28 formed on its outermost surface was mounted in the abrasion measurement apparatus of pin-on-disk type used in the embodiment 1 of the invention, and subjected to a continuous operation at a speed of 10000 rpm and 60° C. for 3000 hrs. Its head under random seek during the continuous operation is forced

TABLE 4

| SAMPLES | NUM. AVER. MOL. WEIGHT | SUB. RATIO OF END FUNC. GROUP | MOL. WEIGHT DISTR. MW/MN | RATIO OF MOL. WT. LESS THAN 1000 (%) | RATIO OF MOL. WT. ABOVE 7000 (%) | STICKTION (GF) | NO. OF ERRORS IN REPRODUCTION |
|---|---|---|---|---|---|---|---|
| 1 | 3300 | 92% | 1.46 | 9.4 | 14.6 | 4.39 | 13 |
| 2 | 3250 | 92% | 1.38 | 6.3 | 13.0 | 4.09 | 9 |
| 3 | 3220 | 92% | 1.28 | 5.8 | 11.9 | 2.18 | 3 |
| 4 (COMP. 13) | 3200 | 92% | 1.58 | 12.9 | 16.8 | 8.35 | 18 |
| 5 (COMP. 14) | 3240 | 92% | 1.63 | 9.1 | 17.9 | 8.57 | 10 |
| 6 (COMP. 15) | 3300 | 92% | 1.66 | 15.4 | 13.0 | 3.91 | 21 |
| 7 (COMP. 16) | 3200 | 86% | 1.24 | 7.7 | 8.4 | 7.32 | 15 | intermittently to slide in contact with the disk by use of a piezo element. After the operation, sticktion between the head and the disk, a quantity of abrasion in the surface of the disk and a reduction (from its initial film thickness) in the thickness of the lubrication film were measured. The quantity of abrasion was evaluated by a maximum abrasion depth measured using an atomic force microscope (AFM). The lubrication film thickness was measured by Fourier transform infrared spectrophotometer (FT-IR) as done in embodiment 1. A result of such measurements is shown in Table 5.

inversely, a lubricant component having no functional group in the end group tends to dissolve in a thick solvent more preferably. A lubricant from which a low molecular weight component is removed, that is, a lubricant on the side of the thick solvent, tends to have a high molecular weight, however, its substitution ratio of the functional group at the end group drops. In the ultrafiltration method, because its division is effectuated simply by a diameter (filter) of the ultrafilter, its substitution ratio does not drop. Namely, the reason why the sticktion of the present embodiment is lower

TABLE 5

| SAMPLES | NUM. AVER. MOL. WEIGHT | SUB. RATIO OF END FUNC. GROUP | MOL. WEIGHT DISTR. MW/MN | RATIO OF MOL. WT. LESS THAN 1000 (%) | RATIO OF MOL. WT. ABOVE 7000 (%) | REDUCED FILM THICKNESS (NM) | STICKTION (GF) | MAX. ABRASION DEPTH IN DISK SURFACE (NM) |
|---|---|---|---|---|---|---|---|---|
| 1 | 3030 | 96% | 1.48 | 9.8 | 14.8 | 0.06 | 2.96 | 2.3 |
| 2 | 3030 | 96% | 1.41 | 7.6 | 13.1 | 0.04 | 2.31 | 0.7 |
| 3 | 3020 | 96% | 1.34 | 6.2 | 12.3 | 0.01 | 0.98 | 0.2 |
| 7 (COMP. 17) | 2020 | 85% | 1.06 | 4.3 | 5.1 | 1.30 | 2.56 | 8.2 |
| 8 (COMP. 18) | 2430 | 85% | 1.20 | 7.6 | 7.8 | 1.23 | 2.71 | 7.1 |
| 9 (COMP. 19) | 3570 | 85% | 1.26 | 7.5 | 8.1 | 0.06 | 6.32 | 2.5 |
| 10 (COMP. 20) | 3010 | 85% | 1.23 | 7.5 | 7.9 | 1.06 | 5.30 | 5.9 |
| 4 (COMP. 21) | 2900 | 96% | 1.86 | 13.6 | 17.4 | 0.79 | 5.94 | 4.4 |
| 5 (COMP. 22) | 3000 | 96% | 1.68 | 9.8 | 18.2 | 0.08 | 6.11 | 2.9 |
| 6 (COMP. 23) | 3030 | 96% | 1.71 | 15.8 | 13.1 | 1.00 | 2.69 | 5.1 |

From comparison between comparison specimens 4–6 and the specimens 1–3 of this embodiment of the invention, it is clearly known that by controlling both of low molecular weights and high molecular weights to be appropriately balanced according to this embodiment of the invention, a magnetic disk that features a small decrease in the film thickness of its lubrication film, a small maximum abrasion depth, and a small sticktion can be realized. Further, from comparison between the specimens 7–10 and the embodiment of the invention, because its substitution ratio of the functional group in the end-group can be maintained at a high level, it is known that a decrease in the lubricant film thickness, the maximum abrasion depth and the sticktion are enabled to be minimized.

With respect to the sticktion and the maximum abrasion depth, both of its substitution ratio and its numeric average molecular weight have an influence on them. However, at least, judging from the results of comparison examples 17–19, there is a tendency that the smaller the numeric average molecular weight becomes, the smaller the sticktion becomes and the greater the maximum abrasion depth becomes. In contrast, there is another tendency that the greater the numeric average molecular weight, the greater the sticktion becomes, and the smaller the maximum abrasion depth becomes.

When compared with physical values of comparison example 20, the present embodiment of the invention has a higher substitution ratio of the functional group in the end group. The reason why the substitution ratio decreases in the solvent extraction method is due to that because of a strong affinity between a weak solvent and the end functional group, a lubricant having a functional group in the end-group tends to dissolve selectively in the weak solvent, and than that of comparison example 20 is due to that, by maintaining a high substitution ratio, a lubricant component that does not adsorb to the disk or has a weak adsorption force becomes smaller than in the case of comparison example 20. In the solvent extraction method, its initial substitution ratio of the lubricant prior to its processing cannot be maintained and tend to drop, therefore, it is difficult to obtain a lubricant that has a substitution ratio greater than 90%. However, in the lubricant according to the present embodiment of the invention, its substitution ratio can be maintained at a value not less than 90%.

Further, according to the present embodiment of the invention, a hydrophilic ultrafilter that can divide molecular weights at a predetermined value as a borderline in a range of 1000 to 8000 of molecular weights is treated so as to allow for a hydrophobic substance to permeate therethrough via an alcoholic solvent, then the ultrafiltration method was executed using the same. Therefore, its molecular weight and molecular weight distribution are controlled appropriately thereby obtaining a lubricant featuring the high substitution ratio of the functional group at the end group not less than 90%.

Although it is difficult for comparison samples 17–20 to have a sticktion and a maximum abrasion depth corresponding to those of specimen 3 of the present embodiment of the invention because of an influence by its substitution ratio, it can be judged from the tendencies of comparison examples 17–20 that, in particular, in order to obtain a sticktion less than 5 gf and a maximum abrasion depth less than 5 nm, a numeric average molecular weight is preferably at least not less than 2500 and less than 3500. Namely, by controlling its numeric average molecular weight to be not less than 2500 and less than 3500, and its substitution ratio of the lubricant to be not less than 90% as done in the present embodiment of the invention, there can be obtained a magnetic disk having a sticktion less than 5 gf and a maximum abrasion depth less than 5 nm.

EMBODIMENT 6

A Magnetic Disk Using a Lubricant of Structural Formula (3)

A magnetic disk according to embodiment 6 of the invention is a magnetic disk similar to that of embodiment 5 except that it uses a perfluoropolyether lubricant of structural formula (3). This magnetic disk of the present embodiment was evaluated in the same method as for embodiment 5. A result of evaluation is shown in Table 6.

Magnetic disk 29 according to embodiment 5 of the invention is mounted on a spindle motor, and a magnetic disk apparatus 30 comprising housing 7, spindle motor 8, actuator 9, magnetic head slider 10, and control circuit 11 is manufactured. This magnetic disk apparatus 30 has a load/unload mechanism, and is provided with ramp 31 for evacuating the magnetic head slider to an in-plane portion in a periphery of the disk during stoppage of the disk, thereby allowing the magnetic head slider to exist on the surface of the disk only when the disk is in rotation. In magnetic disk apparatus 30 according to this embodiment of the invention, its head is evacuated out of the plane of the disk when the disk is at stoppage.

In evaluation of magnetic disk apparatus 30 according to the present embodiment of the invention, load/unload testing of magnetic head slider 10 was repeated at 60° C. for 3000

TABLE 6

| SAMPLES | NUM. AVER. MOL. WEIGHT | SUB. RATIO OF END FUNC. GROUP | MOL. WEIGHT DISTR. MW/MN | RATIO OF MOL. WT. LESS THAN 1000 (%) | RATIO OF MOL. WT. ABOVE 7000 (%) | REDUCED FILM THICKNESS (NM) | STICKTION (GF) | MAX. ABRASION DEPTH IN DISK SURFACE (NM) |
|---|---|---|---|---|---|---|---|---|
| 1 | 3300 | 92% | 1.46 | 9.4 | 14.6 | 0.11 | 4.32 | 3.1 |
| 2 | 3250 | 92% | 1.38 | 6.3 | 13.0 | 0.04 | 3.94 | 1.2 |
| 3 | 3220 | 92% | 1.28 | 5.8 | 11.9 | 0.02 | 1.56 | 0.5 |
| 7 (COMP. 24) | 2000 | 86% | 1.10 | 4.4 | 5.2 | 1.35 | 3.07 | 9.8 |
| 8 (COMP. 25) | 2450 | 86% | 1.23 | 7.7 | 7.9 | 1.26 | 3.24 | 9.1 |
| 9 (COMP. 26) | 3650 | 86% | 1.25 | 7.8 | 8.6 | 0.10 | 8.64 | 3.2 |
| 10 (COMP. 27) | 3200 | 86% | 1.24 | 7.7 | 8.4 | 1.14 | 7.80 | 7.5 |
| 4 (COMP. 28) | 3200 | 92% | 1.58 | 12.9 | 16.8 | 0.85 | 8.26 | 5.1 |
| 5 (COMP. 29) | 3240 | 92% | 1.63 | 9.1 | 17.9 | 0.09 | 8.51 | 3.2 |
| 6 (COMP. 30) | 3300 | 92% | 1.66 | 15.4 | 13.0 | 1.01 | 3.99 | 6.0 |

According to this embodiment 6 (ultrafiltering) of the invention, a lubricant having a substitution ratio in excess of 90% can be obtained by treating with a hydrophilic ultrafilter film that is treated such that a hydrophobic lubricant becomes permeating via alcohol group solvent.

When compared comparison examples 28–30 (specimens 4–6) that were treated by the ultrafiltration method with the result of the present embodiment of the invention, a result having the same tendency similar to that of embodiment 5 of the invention was obtained. Likewise the embodiment 5, by controlling both of the low molecular weight and high molecular weight to balance appropriately, a highly reliable magnetic disk featuring a minimal loss of a lubricant film, a minimal quantity of abrasion and a reduced sticktion can be obtained.

EMBODIMENT 7

A Magnetic Disk Apparatus Using a Lubricant of Structural Formula (2)

Figure 3:
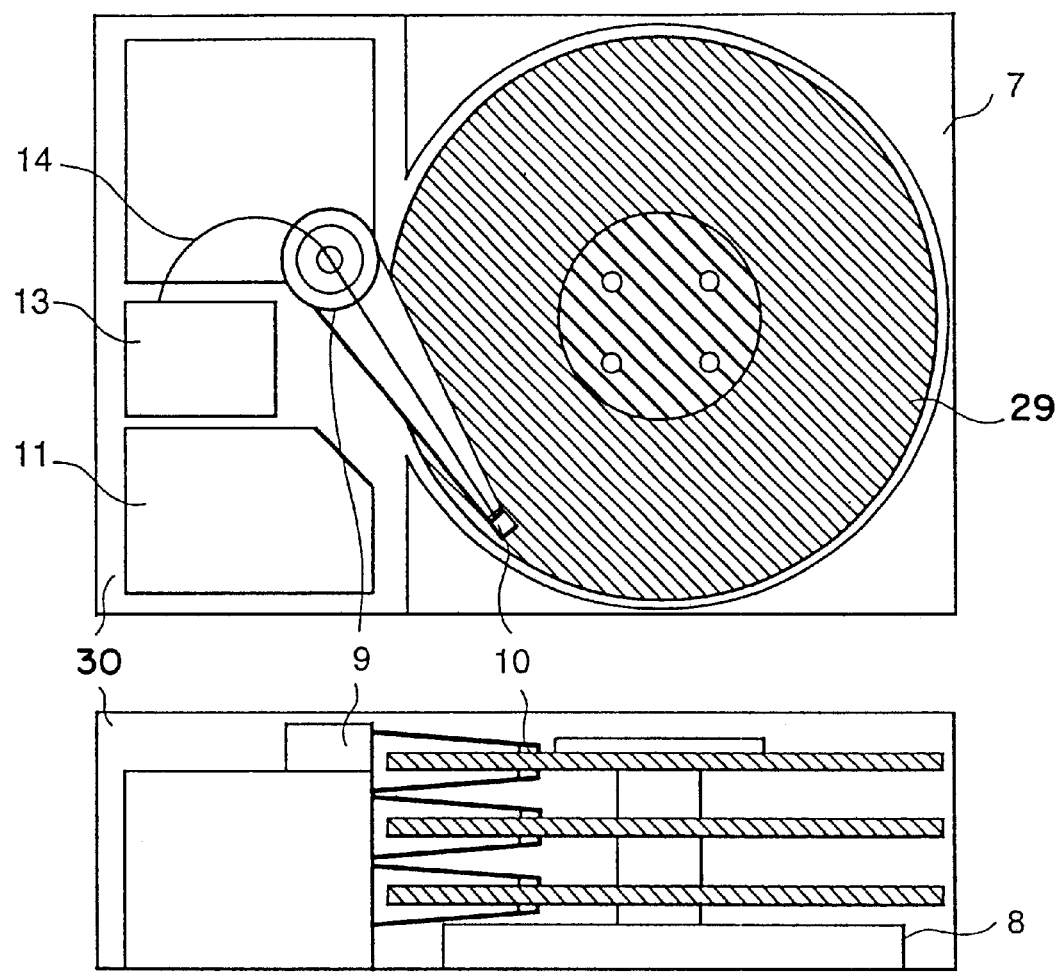
FIG. 3 is a plan view and a side view of a magnetic disk apparatus of type (A) according to embodiments 7 and 8 of the invention.

FIG. 3 shows a stop and a side views of a magnetic disk apparatus 30 according to embodiment 7 of the invention. Magnetic disk apparatus 30 is a magnetic disk apparatus of type (A), and installs magnetic disk 29 according to embodiment 5 (type (a)) that uses the lubricant having structural formula (2). A method of manufacture of magnetic disk apparatus according to this embodiment of the invention will be described in detail in the following.

hrs. A method of evaluation adopted here will be described specifically in the following. Firstly, magnetic head slider 10 is loaded on the surface of magnetic disk 29 under acceleration and subjected to a random seek for 7 sec. Then, the slider is unloaded out of the plane of magnetic disk 29, and is retained there for 1 sec. These series of operations are repeated. When magnetic head slider 10 is fully loaded on the surface of magnetic disk 29 in this condition is 1000 rpm. After operation for 3000 hrs under the above prescribed conditions, the operation was stopped for 6 hrs, then, a status of operation upon a resumed load/unload testing (dynamic stability of unload) was confirmed. At a time of resumed loading/unloading, if a strong sticktion occurs between the head and the disk, there occurs a problem that the head cannot unload. That is, the status of operation at the time of restarting (upon resuming of load/unload) indicates its degree of stable operation over a long period of time for the magnetic disk apparatus of the load/load type. Further, in this evaluation, a record reproduction error was also measured at the time of restarting of load/unload operation. The record reproduction error is mainly caused by abrasion between the magnetic disk and the head, in a faulty position where record reproduction occurred, a loss of information due to abrasion and unstable floating of the head take place. The number of record reproduction errors represents a stability in record reproduction characteristics of the magnetic disk apparatus. Therefore, a magnetic disk apparatus that is stable in its status during load/unload operation and has a reduced number of record reproduction errors provides for a highly reliable magnetic disk apparatus that ensures a normal operation to be continued for a long period of time and will not impair its record reproduction property that is the most important function of the apparatus. Statuses at the load/unload operations and the number of record reproduction errors are indicated in Table 7.

operation during resumed load/unload operation and to reduce the number of record reproduction errors less than 8, a numeric average molecular weight is preferably controlled to be at least not less than 2500 and no more than 3500. Namely, in the ultrafiltration method as in this embodiment of the invention, by controlling its numeric average molecular weight to be not less than 2500 and no more than 3500,

TABLE 7

| SAMPLES | NUM. AVER. MOL. WEIGHT | SUB. RATIO OF END FUNC. GROUP | MOL. WEIGHT DISTR. MW/MN | RATIO OF MOL. WT. LESS THAN 1000 (%) | RATIO OF MOL. WT. ABOVE 7000 (%) | NO. OF ERRORS IN RE-PRODUCTION | LOAD/UNLOAD OPERATION |
|---|---|---|---|---|---|---|---|
| 1 | 3030 | 96% | 1.48 | 9.8 | 14.8 | 8 | NORMAL |
| 2 | 3030 | 96% | 1.41 | 7.6 | 13.1 | 7 | NORMAL |
| 3 | 3020 | 96% | 1.34 | 6.2 | 12.3 | 2 | NORMAL |
| 7 (COMP. 31) | 2020 | 85% | 1.06 | 4.3 | 5.1 | 30 | NORMAL |
| 8 (COMP. 32) | 2430 | 85% | 1.20 | 7.6 | 7.8 | 28 | NORMAL |
| 9 (COMP. 33) | 3570 | 85% | 1.26 | 7.5 | 8.1 | 8 | ABNORMAL (NOT LOADING) |
| 10 (COMP. 34) | 3010 | 85% | 1.23 | 7.5 | 7.9 | 9 | ABNORMAL (NOT LOADING) |
| 4 (COMP. 35) | 2900 | 96% | 1.86 | 13.6 | 17.4 | 16 | ABNORMAL (NOT LOADING) |
| 5 (COMP. 36) | 3000 | 96% | 1.68 | 9.8 | 18.2 | 8 | ABNORMAL (NOT LOADING) |
| 6 (COMP. 37) | 3030 | 96% | 1.71 | 15.8 | 13.1 | 26 | NORMAL |

Comparison examples 31–34 (by the solvent extraction method), in which substitution ratios of lubricants on the surface of the magnetic disk is less than 90%, could not provide for a highly reliable magnetic disk apparatus. In contrast, the present embodiment of the invention (by ultrafiltration method), in which its substitution ratio of the lubricant on the surface of the magnetic disk is not less than 90%, provides for an excellent magnetic disk apparatus featuring a stable operation of the apparatus, stable record reproduction characteristics and a high reliability.

It is difficult for comparison examples 31–34 to improve their conditions of operation during restart of the load/unload operation and the number of record reproduction errors to the level of specimen 3 of the present embodiment of the invention because of the influence by their substitution ratios. From the tendencies of comparison examples 31–34, it can be judged that in order to secure a normal the substitution ratio of the lubricant can be maintained not less than 90%, thereby enabling to provide for a magnetic disk apparatus featuring without abnormality operation during resumed load/unload operation and a minimum number of record reproduction errors.

EMBODIMENT 8

A Magnetic Disk Apparatus Using a Lubricant of Structural Formula (3)

A magnetic disk apparatus according to embodiment 8 of the invention is a magnetic disk apparatus of type (A), in which a magnetic disk of embodiment 6 (type (a)) which uses the lubricant of structural formula (3) is mounted. This magnetic disk apparatus was evaluated in the same method as embodiment 7 described above. A result of evaluation is shown in Table 8.

TABLE 8

| SAMPLES | NUM. AVER. MOL. WEIGHT | SUB. RATIO OF END FUNC. GROUP | MOL. WEIGHT DISTR. MW/MN | RATIO OF MOL. WT. LESS THAN 1000 (%) | RATIO OF MOL. WT. ABOVE 7000 (%) | NO. OF ERRORS IN RE-PRODUCTION | LOAD/UNLOAD OPERATION |
|---|---|---|---|---|---|---|---|
| 1 | 3300 | 92% | 1.46 | 9.4 | 14.6 | 9 | NORMAL |
| 2 | 3250 | 92% | 1.38 | 6.3 | 13.0 | 6 | NORMAL |
| 3 | 3220 | 92% | 1.28 | 5.8 | 11.9 | 3 | NORMAL |
| 7 (COMP. 38) | 2000 | 86% | 1.10 | 4.4 | 5.2 | 28 | NORMAL |
| 8 (COMP. 39) | 2450 | 86% | 1.23 | 7.7 | 7.9 | 24 | NORMAL |
| 9 (COMP. 40) | 3650 | 86% | 1.25 | 7.8 | 8.6 | 8 | ABNORMAL (NOT LOADING) |
| 10 (COMP. 41) | 3200 | 86% | 1.24 | 7.7 | 8.4 | 11 | ABNORMAL (NOT LOADING) |
| 4 (COMP. 42) | 3200 | 92% | 1.58 | 12.9 | 16.8 | 17 | ABNORMAL (NOT LOADING) |

TABLE 8-continued

| SAMPLES | NUM. AVER. MOL. WEIGHT | SUB. RATIO OF END FUNC. GROUP | MOL. WEIGHT DISTR. MW/MN | RATIO OF MOL. WT. LESS THAN 1000 (%) | RATIO OF MOL. WT. ABOVE 7000 (%) | NO. OF ERRORS IN RE- PRODUCTION | LOAD/UNLOAD OPERATION |
|---|---|---|---|---|---|---|---|
| 5 (COMP. 43) | 3240 | 92% | 1.63 | 9.1 | 17.9 | 10 | ABNORMAL (NOT LOADING) |
| 6 (COMP. 44) | 3300 | 92% | 1.66 | 15.4 | 13.0 | 20 | NORMAL |

According to this embodiment 8 of the invention, likewise the embodiment 7, by controlling both of its low molecular weight and its high molecular weight to be balanced appropriately, a highly reliable magnetic disk apparatus can be obtained, which has a minimized number of record reproduction errors and maintains a stable normal load/unload operation.

EMBODIMENT 9

A lubricant's Molecular Weight Control Unit

Figure 6:
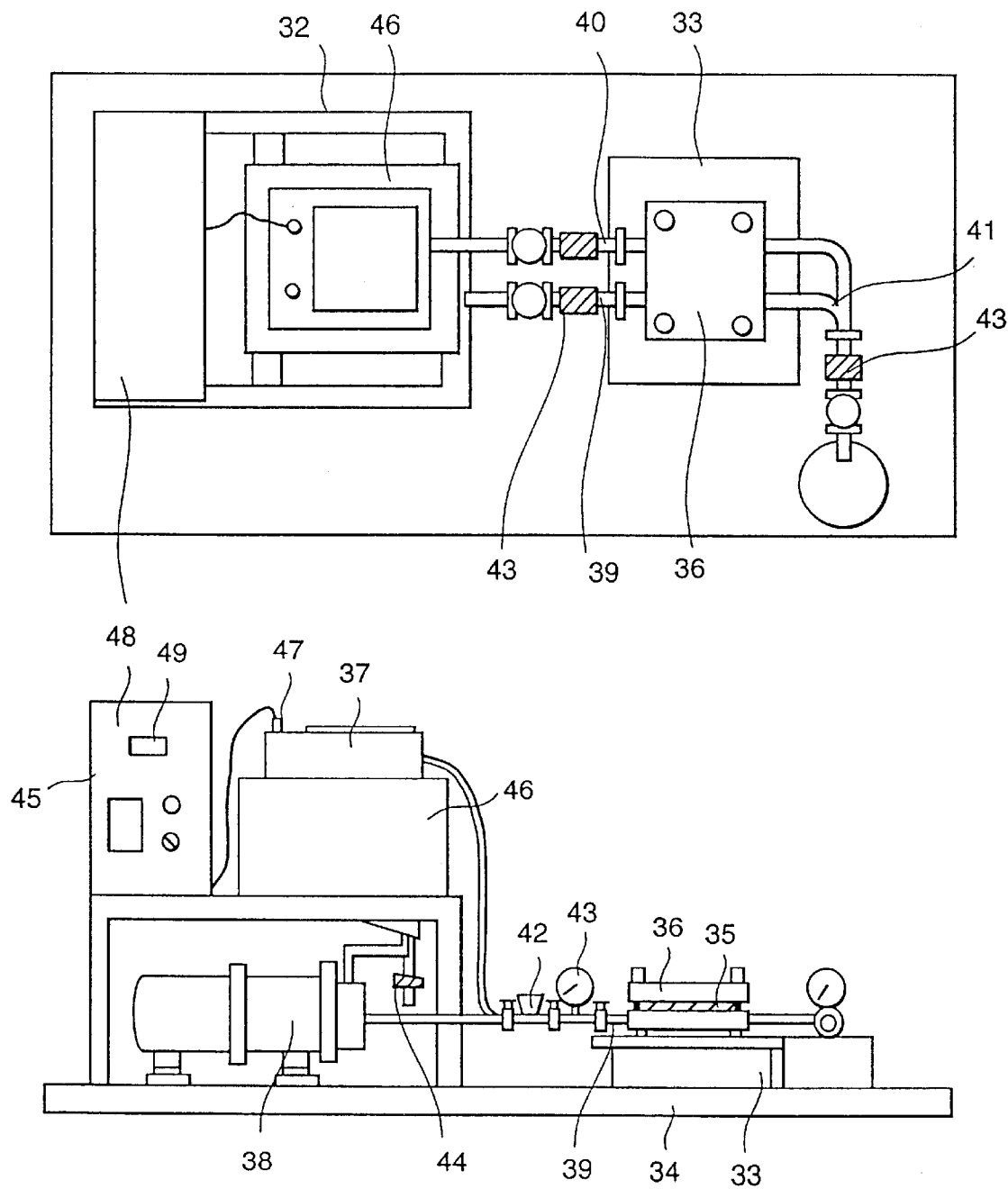
FIG. 6 is a plan view and a side view of a molecular weight controller according to embodiment 9 of the invention.

FIG. 6 shows a lubricant's molecular weight control unit according to embodiment 9 of the invention. The lubricant's molecular weight control unit according to embodiment 9 is comprised of a solution circulating unit section 32, a ultrafiltration unit section 33 and each piping thereof. Solution circulating unit section 32 and ultrafiltration unit section 33 are mounted on a same drain pan 34.

A main portion of ultrafiltration unit section 33 includes a main body 36 for firmly fixing a ultrafilter 35, and inlet pipe 39 for receiving a solution from solution tank 37 via solution circulating pump 38, outlet pipes 40 returning to solution tank 37 and 41 for flowing a solution that permeated through ultrafilter 35, a flow regulating cock 42 and a pressure gauge 43. A pressure applied to ultrafilter 35 can be varied by the flow regulating cock. In the main body 36, there are provided two flow paths, one dedicated for passing a solution that has permeated ultrafilter 39 and the other dedicated for returning a solution that has not permeated the ultrafilter, and they are connected to the above respective pipes.

A main portion of solution circulating unit section 32 includes a solution tank 37, a liquid circulating pump 38, a drain cock 44, and a box 45 that accommodates inverter and power supply. Solution circulating unit section 32 is required to circulate a solution at a constant pressure and a constant flow rate to ultrafiltration unit section 33. Further, the same is required to have an excellent property in that contamination and/or elution from various structural members will be prevented from being included while taking into account the manufacture and productivity thereof. In this embodiment of the invention, in order to accomplish the above object, the following measures are contemplated and incorporated in this solution circulating unit section 32.

As a measure for prevention of contamination, solution tank 37 was manufactured using SUS 316, and further, its surface was subjected to electrolytic polishing. Solution tank 37 which can accommodate 10 liters of solution is firmly fixed to the frame by welding. Further, according to the present embodiment of the invention, in order to prevent any elution from external into the solution, all of respective packing members are made of polytetrafluoroethylen (PTFE). Comparison example 45 used solution tank 37 which was not subjected to electrolytic polishing. Further, its packing members used silicone rubber.

Figure 7:
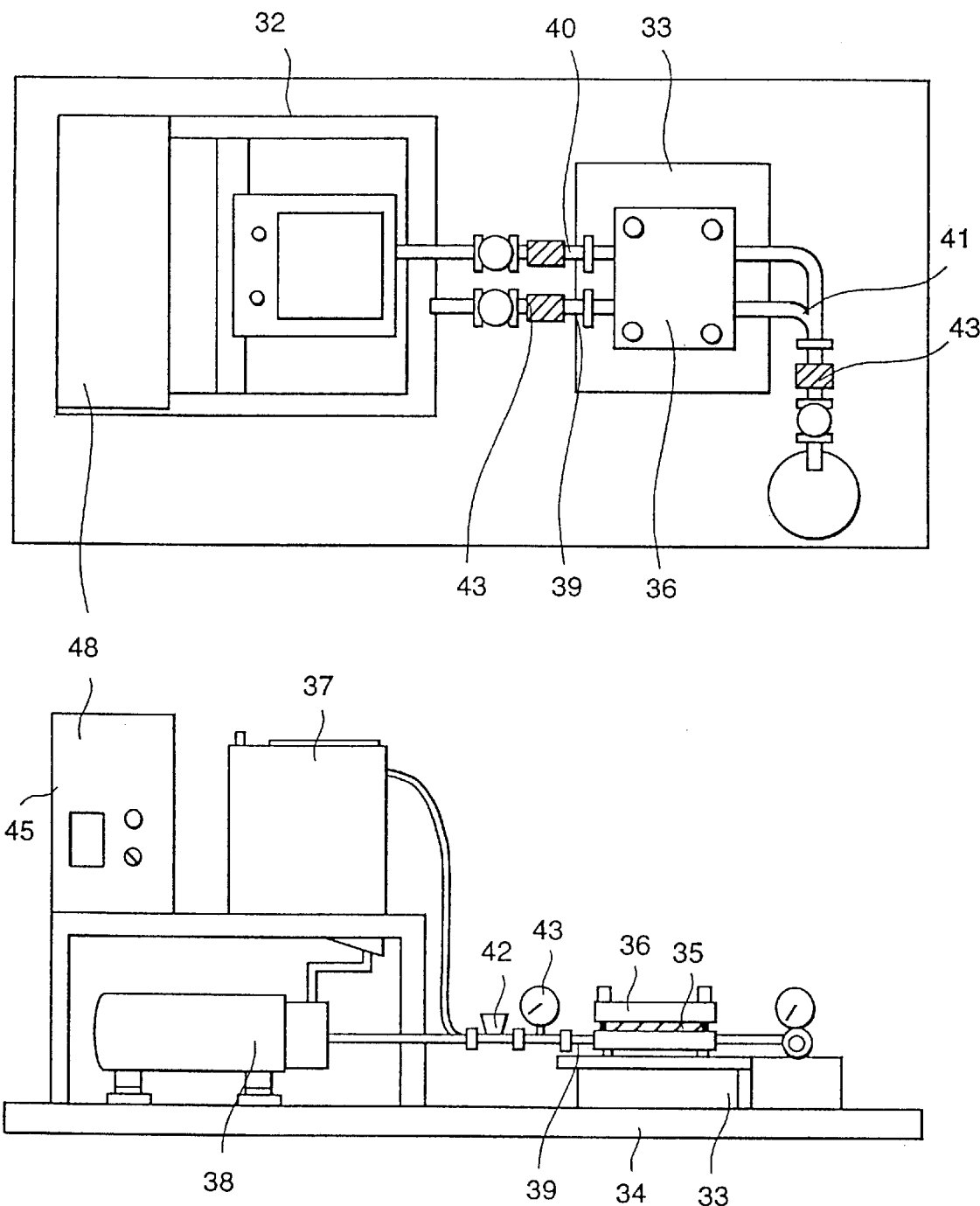
FIG. 7 is a plan view and a side view of a molecular weight controller according to a comparison example 45.

FIG. 7 shows a lubricant's molecular weight control unit of comparison example 45. In both the control units of comparison example 45 and the present embodiment of the invention, perfluoropolyether lubricants were treated, respectively. Each contamination not less than 0.2 µm included in respective perfluoropolyether lubricants after treatment was measured by a photo scattering method. As a result, in the control unit according to this embodiment of the invention in which tank 37 subjected to electrolytic polishing was used, the number of contamination not less than 0.2 µm per unit volume was 21. On the other hand, in the control unit of comparison example 45, the number of contamination was 256. Thereby, the control unit according to this embodiment of the invention can treat the lubricant cleanly.

In order to ensure for the solution to be circulated at a stable pressure and flow rate, the following measures have been taken. It is noted that the most important factor that influences the circulating pressure and flow rate of solution is a pressure variation in the tank 37. This pressure variation is due to volatilization of solvent in the solution, which results in an overpressure within the tank 37. In particular, when a highly volatilizing solvent is used, an overpressure in the tank tends to occur. Therefore, in the control unit of this embodiment of the invention, there is provided a cooling function for cooling the solvent in the tank 37 lower than its boiling temperature, and its solution circulating pump was selected that prevents heat transfer to the solution.

More specifically, the cooling function is provided by a cooling jacket 46 fixed on the external surface of solution tank 37, through which a constant temperature cooling water was passed thereby maintaining the solution in the tank at a constant temperature. The cooling water flowing through the jacket is 20° C. or lower. Further, as its solution circulating pump that prevents heat transfer, a gear pump was selected. The gear pump selected here has a capacity of 1.7 liter/min., a maximum outlet pressure of 3.6 kgf/cm2 (Iwaki Pump K.K.: chemical gear pump type GM-12), and is fixed on drain pan 34 via vibration damper rubber in the lower portion of the solution tank 37.

Further, the lubricant'molecular weight control unit has a structure in which the ultrafiltration film subjected to the above treatment is mounted in a dedicated holder having a permeating path and a circulating path for enabling a stable permeation and circulation of solution from the solution circulating unit. In addition, with provisions of a liquid level sensor, timer and the like for use in control of the treatment of the solution, productivity is fully taken into account in its structure.

In comparison example 45, cooling water jacket 46 was not installed, and a magnet pump (Iwaki Pump K.K., Magnet Pump Type: MD-30R-N) was adopted as its solution circulating pump. A solution of HFE-7100 (initial temperature; 18° C.) manufactured by 3M Co. was filled into the tanks of the present embodiment and comparison example 45, and continuously circulated for 6 hours, then, temperatures of their HFE-7100 solutions were measured.

As a result, in comparison example 45, HFE-7100 after 6 hours rised to 35° C., and its pressure increased with elapse of time and its flow rate was unstable. On the other hand, in this embodiment of the invention, its HFE-7100 after 6 hours retained 18° C., and its pressure and flow rate were maintained stable. This is due to that, in comparison example 45, because heat from its magnet pump is directly dissipated into the solution, and its tank is not provided with a cooling function, the temperature of HFE-7100 in the tank readily rises thereby causing HFE-7100 to volatilize and thereby resulting in a state of overpressure within the tank. In contrast, in the present embodiment of the invention, by provisions of the gear pump and water cooling jacket 46, heat dissipation to the solution is minimized and the solution in the tank is cooled, therefore, a constant pressure is always maintained in the tank.

Namely, in the control unit of the present embodiment of the invention, the temperature of the solution in the tank can be maintained at a constant temperature, and its solution can be circulated at a constant pressure and a constant flow rate. Further, using the unit of comparison example 45, a solution dissolving a lubricant having structural formula (2) was prepared, and its molecular weights were controlled.

By the unit of comparison example 45, a component of molecular weights less than 1000 was 11.2 wt. %, a component of molecular weights not less than 7000 was 16.2 wt. %, and a ratio between a weight average molecular weight and a numeric average molecular weight was 1.63, therefore, a desired lubricant could not have been obtained. On the other hand, by the unit of the present embodiment of the invention, a component of molecular weights less than 1000 was 6.2 wt. %, a component of molecular weights not less than 7000 was 12.3 wt. %, and a ratio between a weight average molecular weight and a numeric average molecular weight was 1.34, therefore, a desired lubricant has been obtained. Namely, in the present embodiment of the invention, because of the provision of the cooling mechanism to the tank in combination with the gear pump that hardly transfers heat to the solution, the temperature of the solution in the tank is maintained constant and the solution is circulated at a constant pressure and constant flow rate, and further the desired lubricant has been obtained.

A productivity-oriented function to improve productivity is provided as follows. Firstly, solution tank 37 is provided with two drain cocks 44 for recovering the solution at the bottom of the tank, and also with a liquid level sensor 47. Liquid level sensor 47 is interlocked with an inverter 48 that controls liquid circulating pump 38. In order to protect liquid circulating pump 38, when a liquid level drops lower than a predetermined height, liquid circulating pump 38 is stopped. In comparison of the unit according to this embodiment of the invention with the unit of comparison example 45 that is not provided with the drain cocks and the liquid level sensor, the former could recover the solution approximately in $\frac{1}{10}$ of period of time of the latter.

Further, in the comparison example 45, a constant monitoring of a quantity of solution in the tank was required. However, in the unit of this embodiment of the invention, because a quantity of solution can be sensed and controlled by the liquid level sensor, there is no need of constant monitoring of the quantity of solution in the tank. Therefore, a total time of constraint for the worker required over the whole treatment processes is reduced approximately to $\frac{1}{20}$ of that in comparison example 45. Further, in the unit according to this embodiment of the invention, a timer 49 interlocked with the inverter is mounted on a side wall of box 45, thereby not only by the liquid quantity control using the liquid level sensor, but also by a time of operation set for liquid circulating pump 38, it can be controlled. Still further, each joint of each piping in the present embodiment of the invention is provided in ferrule in order to prevent fungus and bacteria and in consideration of workability in cleaning, therefore, a time required for assembly and cleaning of the unit is reduced approximately to $\frac{1}{5}$ of the comparison example 45 in which all joints of piping was provided in a sewage lock type.

EMBODIMENT 10

A Method of Controlling Lubricant's Molecular Weight Using Structural Formula (2)

In this embodiment 10 of the invention, a perfluoropolyether with structural formula (2), a numeric average molecular weight of which prior to treatment was 2000, was treated such that its numeric average molecular weight becomes approximately 3000.

Firstly, in order to enable controlling of molecular weights of lubricants by means of the ultrafilter film, a treatment was applied to a hydrophilic ultrafilter film such that it allows permeation of a perfluoropolyether lubricant that is a hydrophobic substance. A filter 35 (Nihon Paul K.K., Omega Series 1k: can divide molecular weights at about 1000) having a plurality of laminated ultrafilter films made of polyethersulfon was prepared. Glyceline and contamination attached to the lamination filter were removed by immersing the filter in pure water of 5 liters, and splashing therein for about 1 minute. This operation is repeated three times. In each operation, pure water was changed with new one.

Next, filter 35 is mounted on ultrafiltration unit section 33 described with reference to FIG. 6, and the ultrafiltration unit section 33 and solution circulating unit section 32 of FIG. 6 are connected using piping made of PFA (tetrafluoroethylen-perfluoroalxyle-vinylether) and SUS 316 with a diameter of 10 mm. Pure water of 5 liters was filled in tank 37 of solution circulating unit section 32, and by means of solution circulating pump 38 (Iwaki Pump K.K., chemical gear pump) provided in the lower portion of the tank, pure water was permeated and circulated through the filter for 5 hours at an inlet pressure: 0.5 kgf/cm2, return pressure: 0.4 kgf/cm2 and a flow rate: 1.5 liter/min. This operation was done for the purpose of cleaning the filter (ultrafiltration film), therefore, pure water was supplied to tank 37 at a rate of 2 liter/min, and a piping for a return water from the ultrafiltration unit section was not connected to tank 37. A portion of pure water that has permeated the filter was thrown out.

Further, through this operation, water molecules are adsorbed on the surface of the ultrafiltration film. Then, in order to allow for a hydrophobic substance to be able to permeate the filter, an operation was executed to remove pure water present in the filter and substitute the water molecules adsorbed on the surface of ultrafiltration film by ethylalcohol molecules. Firstly, a solvent mixture containing a hydrofluoroether group solvent (3M, HFE-7100) and ethylalcohol at a ratio of 7:1 was prepared. After removal of pure water from the tank and piping, a 3 liters of the above solvent mixture was filled in tank 37, and the solvent mixture was permeated and circulated therethrough in the same conditions as in the cleaning operation. When the solvent mixture ran out from the tank, solution circulating pump 38 was stopped and a new solvent mixture of 3 liters was filled in the tank, and the permeation and circulation of the solvent mixture was resumed. This series of operation was repeated three times. Through these operations, all of the pure water within the filter was removed by ethylalcohol, that is, water molecules adsorbed on the surface of the ultrafiltration film was substituted by ethylalcohol molecules.

Then, a 3 liter of HFE-7100 was permeated and circulated to make sure that HFE-7100 will permeate. In this operation, a return pipe of HFE-7100 solution was connected to the tank. Through the above operations, treatments of cleaning of the filter and allowing for the hydrophobic substance to permeate the filter were completed.

In addition to the above filter 1 K, another filter (Nihon Pall Ltd., Omega Series 8K) capable of dividing molecular weights at about 8000 was also treated by the same method. By way of example, after permeation and circulation of pure water through a filter that was not applied the above substitution operation, HFE-7100 was circulated but it did not permeate the filter. Namely, for the first time in this embodiment of the invention in which the above treatments were applied to the ultrafiltration film, it has become possible to allow for the hydrophilic ultrafiltration film to permeate the hydrophobic substance.

Then, a treatment of the perfluoropolyether lubricant was executed. The filter of Omega Series 8K manufactured by Nihon Pall Ltd. subjected to the above cleaning and hydrophobic substance permeation treatments was mounted on ultrafiltration unit section 33 of FIG. 6, and each portion is connected with piping. A circulating solution from ultrafiltration unit section 33 is piped to return to the tank. In the ultrafiltration unit section 33, a solution supplied from the tank by means of the solution circulating pump is divided into a component of solution that permeates the ultrafilter and another component of solution that returns to the tank without permeating the filter. A treatment to separate a component at a high molecular weight was conducted.

A solution of 5 liters was prepared by adding HFE-7100 to a perfluoropolyether lubricant of 500 g, and filled in tank 37 of solution circulating unit section 37 shown in FIG. 6. As applicable solvents other than HFE-7100, there are 3M's FC-72, FC-84, FC-77, FC-75, PF-5080, PF-5052, HFE-7200 that dissolve perfluoropolyether lubricants, DuPont's Bartles XF, XE, XM that are fluorine-containing solvents.

Solution circulating pump 38 was started to initiate controlling of molecular weights of the lubricant. Through this operation, as for a perfluoropolyether lubricant on the side of permeation, its component of lubricant having molecular weights not less than approximately 8000 is gradually removed (condensed in the tank), thereby causing its component of lubricant to have low molecular weights. In this embodiment of the invention, the solution circulating pump 38 was stopped when a quantity of 4.375 liters of the solution on the side of permeation was obtained, and this solution of permeation was collected. HFE-7100 was removed by an evaporator, and a perfluoropolyether lubricant from which the high molecular weight component was separated was obtained.

Then, in order to remove the low molecular weight component, a solution of 5 liters as prepared by addition of HFE-7100 to the perfluoropolyether lubricant collected from the above permeation side, and was filled in tank 37 of solution circulating unit section 32 of FIG. 6. In ultrafiltration unit section 33, there is mounted the filter manufactured by Nihon Pall Ltd. (Omega Series 1K), which was subjected to the above cleaning and the hydrophobic substance permeating processing and is capable of dividing molecular weights at a demarcation lime of approximately 1000 of molecular weight. By starting solution circulating pump 38, molecular weight control of the lubrication is initiated. Through this operation, a portion of perfluoropolyether lubricant on the side of circulation (on the side of the tank) tends to have a high molecular weight because from which a low molecular weight component less than 1000 or so is separated toward the side of permeation. When a yield of solution of 1.25 liters was obtained on the side of permeation, liquid circulating pump 38 was stopped, the solution on the side of the tank was recovered, and the molecular weight control for the perfluoropolyether lubricant by means of the ultrafiltration was completed. HFE-7100 was removed from the solution recovered on the side of the tank by means of an evaporator, and a perfluoropolyether lubricant from which both components of the high molecular weight and the low molecular weight have been removed is obtained.

A sample of 10.0 g is pipetted from this perfluoropolyether lubricant, and its numeric average molecular weight and a substitution ratio of its end-group's functional group were measured by NMR. Further, a molecular weight distribution was measured by the liquid chromatography, and a ratio between a molecular weight component smaller than 1000 and a molecular weight component not less than 7000 was also calculated. Still further, yields of lubricants obtained by the process according to this embodiment of the invention were calculated. A result of evaluation is shown in Table 9.

TABLE 9

| METHODS | NUM. AVER. MOL. WEIGHT | SUB. RATIO OF END FUNC. GROUP | MOL. WEIGHT DISTR. MW/MN | RATIO OF MOL. WT. LESS THAN 1000 (%) | RATIO OF MOL. WT. ABOVE 7000 (%) | YIELD (%) |
|---|---|---|---|---|---|---|
| ULTRA FILTER | 3020 | 96% | 1.34 | 6.2 | 12.3 | 53 |
| SOLVENT EXTRACT. (COMP. 46) | 2990 | 85% | 1.21 | 7.6 | 8.1 | 24 |
| GPC (COMP. 47) | 3000 | 94% | 1.03 | 3.4 | 2.0 | 8 |

Although in the solvent extraction method of comparison example 46, its substitution ratio of the lubricant decreases, in the molecular weight control method for the lubricant according to this embodiment of the invention, a substitution ratio of the lubricant can be increased above 90%. When taking note of yields, the ultrafiltration method according to this embodiment of the invention is more efficient than those of comparison example 46 (solvent extraction method) and comparison example 47 (GPC method). In addition, in spite of the fact that the yield by this embodiment of the invention (ultrafiltration method) is about 7 times as large as that of comparison example 47 (GPC method), a quantity of solvent (HFE7100) required for processing is reduced to about ⅕ of that of comparison example 47 (GPC method).

EMBODIMENT 11

A Method of Controlling Molecular Weights of a Lubricant with Structural Formula (3)

A perfluoropolyether lubricant having a structural formula (3) was treated by the same method as the embodiment 10 of the invention such that its initial numeric average molecular weight of 2000 prior to processing becomes approximately 3200 after the treatment. Table 10 shows a result of the treatment.

Likewise the results of the embodiment 10 of the invention, in comparison of the results of lubricants treated by the present embodiment of the invention and comparison example 48 (both of which are of the solvent extraction method) and comparison example 49 (of GPC method), the present embodiment of the invention has given better results in the substitution ratio as well as in yields. Further, in comparison example 48 (solvent extraction method), the same HFE7100 as in comparison example 46 was used for its thick solvent, however, for its lean solvent, because of a difference in its molecular structure of the lubricant, the same solvent as in comparison example 46 could not have been used, and also a ratio between the thick solvent and the lean solvent had to be modified. This means that in comparison examples 46 (solvent extraction), every time the type of lubricants and distributions of molecular weights are changed, it is necessary to change the types of solvents and a ratio between the thick solvent and the lean solvent, thereby necessitating to set up an optimal condition at each time. The lubricant's molecular weight control method according to comparison examples 46, 48 (solvent extraction) has a problem that it lacks a general-purpose applicability. In contrast, the lubricant's molecular weight control method (ultrafiltration) according to this embodiment of the invention has an advantage in that even if the types of lubricants subject to the treatment are changed, its influence is minimized, thereby allowing for a lubricant having a desired molecular weight and molecular weight distribution to be obtained comparatively easily.

EMBODIMENT 12

A Method of Controlling Lubricant's Molecular Weights

A method of controlling lubricant's molecular weights according to embodiment 12 of the invention is a method in which the lubricant's molecular weight control unit (FIG. 6) of embodiment 9 of the invention is used, and molecular weights in a perfluoropolyether lubricant having structural formula (2) is controlled. In this embodiment 12 of the invention, a divider filter capable of dividing molecular weights at a demarcation line of approximately 1000 (Nihon Pall Ltd., Omega Series 1 K) was mounted on the lubricant's molecular weight control unit to perform such a treatment that by removing a low molecular weight component, a numeric average molecular weight of 4990 in an initial stage prior to the treatment is modified to have a numeric average molecular weight of about 6000.

Firstly, likewise in the embodiment 9 of the invention, the treatments of cleaning and enabling the hydrophobic substance permeation was applied to the divider filter capable of dividing molecular weights at the demarcation line of approximately 1000 (Nihon Pall Ltd., Omega Series 1 K).

The filter after the treatments is mounted on ultrafiltration unit section 33, and each portion thereof is piped. A perfluoropolyether lubricant of 500 g was added with HFE-7100 to prepare a solution of 5 liters, and its molecular weight control was started. Through the above operation, a perfluoropolyether lubricant in the loop of circulation is gradually turned to have a high molecular weight in the lubricant (to be condensed in the tank) because a low molecular weight component in the lubricant in a range from 1000 to 1500 is being separated. In this embodiment of the invention, when a quantity of liquid in the loop of permeation becomes 2.25 liters, liquid circulating pump 38 was stopped to collect the solution in the loop of circulation. Removing HFE-7100 by means of evaporator, a perfluoropolyether lubricant from which the low molecular weight component was separated was obtained. Thereby, the molecular weight control of the perfluoropolyether lubricant by means of the ultrafiltration according to the invention was completed. A 10.0 g was pipetted from the perfluoropolyether lubricant, and its numeric average molecular weight and a substitution ratio of its end-group's functional group were measured using NMR. Further, its molecular weight distribution was also measured using the liquid chromatography, and a ratio of molecular weights smaller

TABLE 10

| METHODS | NUM. AVER. MOL. WEIGHT | SUB. RATIO OF END FUNC. GROUP | MOL. WEIGHT DISTR. MW/MN | RATIO OF MOL. WT. LESS THAN 1000 (%) | RATIO OF MOL. WT. ABOVE 7000 (%) | YIELD (%) |
|---|---|---|---|---|---|---|
| ULTRA FILTER | 3220 | 92% | 1.28 | 5.8 | 11.9 | 54 |
| SOLVENT EXTRACT. (COMP. 48) | 3180 | 86% | 1.22 | 7.6 | 8.2 | 19 |
| GPC (COMP. 49) | 3200 | 92% | 1.04 | 3.4 | 2.1 | 8 | than 3000 was calculated. Still further, a yield of the lubricant obtained by the treatment according to this embodiment of the invention was calculated. Table 11 shows a raw material used and a result of measurements and calculations of this embodiment of the invention in comparison with others.

TABLE 11

| METHODS | NUM. AVER. MOL. WEIGHT | SUB. RATIO OF END FUNC. GROUP | MOL. WEIGHT DISTR. MW/MN | RATIO OF MOL. WT. LESS THAN 3000 (%) | YIELD (%) |
|---|---|---|---|---|---|
| ULTRA FILTER | 5995 | 92% | 1.11 | 6.5 | 47 |
| SOLVENT EXTRACT. (COMP. 50) | 6020 | 82% | 1.09 | 5.2 | 32 |
| GPC (COMP. 51) | 5985 | 84% | 1.03 | 2.2 | 8 |
| RAW MATERIAL | 4990 | 94% | 1.22 | 19.6 | — |

The result of this embodiment of the invention was compared with the results of comparison examples 50 and 51 in the following. Firstly, when taking note of the substitution ratio, while in the lubricant of the comparison example 50 that was treated by the solvent extraction method, its substitution ratio dropped as low as 82%, in the lubricant of this embodiment of the invention, which was treated by the ultrafiltration method, its substitution ratio was 92%.

Next, when taking note of the yield of the lubricant, the instant embodiment (ultrafiltration) of the invention is superior to those of comparison 50 (solvent extraction) and comparison 51 (GPC method). In particular, a yield of comparison example 51 (GPC) was worst of all, and a yield of the instant embodiment of the invention was about 6 times as large as that of comparison example 51 (GPC method). Further, according to this instant embodiment of the invention by the ultrafiltration, notwithstanding that its yield is 6 times as large as that of comparison example 51 (GPC), a quantity of solvent (HFE7100) required for the treatment could have been reduced to about ⅕ of that consumed in comparison example 51 (GPC).

Further, as for comparison examples 50 (solvent extraction method) and 51 (GPC method), their molecular weight distributions vary every time the batch of raw material changes, thereby necessitating modification of the conditions in detail. In contrast, according to the instant embodiment of the invention by the ultrafiltration method, the same mode of the molecular weight control can be applied, with only a processing time (a quantity of treatment) modified, to the treatment of a different batch of raw material having a different molecular weight distribution.

As described above, according to the molecular weight control method for the lubricant of this instant embodiment of the invention, a lubricant having a higher substitution ratio (not less than 90%) than the solvent extraction method (comparison example 50) and the GPC method (comparison example 51) can be obtained comparatively easily. Further, the lubricant's molecular weight control method of the instant embodiment of the invention, which can reduce the consumption of solvent (HFE7100) significantly and achieve an improved yield, is advantageous in the cost of manufacture as well.

For the specimens 1–4 in each embodiment of the invention to be described in the following, using a lubricant (raw material) of specimen 5 having a numeric average molecular weight of 4990 and the ultrafiltration method of embodiment 12 of the invention, respective perfluoropolyether lubricants having structural formula (2), in which their numeric average molecular weights are controlled to be 8010, 7020, 6350 and 5750, respectively, were prepared. The following comparison examples were also provided.

Specimen 5: in which a starting (raw) material of lubricant having a numeric average molecular weight of 4990 was used, Specimens 6, 7: in which a starting lubricant having a numeric average molecular weight of 2000 was used, the molecular weight of which was further controlled to have numeric average molecular weights of 4010 and 3020 by the ultrafiltration method, Specimens 8, 9: in which the lubricant of specimen 5 as a starting material having a numeric average molecular weight of 4990 was used, the molecular weight of which was further controlled to have numeric average molecular weights of 5370 and 6020 by the solvent extraction method.

EMBODIMENT 13

A Magnetic Disk of Type (a) Using a Lubricant Having Structural Formula (2)

A magnetic disk according to embodiment 13 of the invention is a magnetic disk of type (a) coated with al lubricant manufactured according to the above embodiment 12 of the invention. A perfluoropolyether lubricant having structural formula (2) was coated by dipping to a thickness of approximately 2 nm. The same evaluation was applied to the magnetic disk of the instant embodiment of the invention as applied to the embodiment 5 of the invention.

The magnetic disk of this embodiment of the invention was mounted on a pin-on-disk type abrasion measuring apparatus, and a quantity of abrasion in the surface of the disk and a reduced thickness from its initial film thickness after a continuous operation for 1000 hours were measured. The magnetic disk was rotated up to 18000 rpm, subjected to a random seek for 3 seconds with the head in float, then the disk speed was dropped to 500 rpm to cause the head and the disk to slide in contact for 0.5 sec. This series of operation was repeated at a short cycle at 65° C. Because the head is not levitated at the disk speed of 500 rpm, an intermittent contact sliding takes place between the head and the disk. Table 12 shows values measured of respective lubricants according to the embodiments of the invention (specimens 1–4) and comparison examples 52–56 (specimens 5–9).

TABLE 12

| SAMPLES | NUM. AVER. MOL. WEIGHT | SUB. RATIO OF END FUNC. GROUP | MOL. WEIGHT DISTR. MW/MN | RATIO OF MOL. WT. LESS THAN 3000 (%) | REDUCED FILM THICKNESS (NM) | MAX. ABRASION DEPTH IN DISK SURFACE (NM) |
|---|---|---|---|---|---|---|
| 1 | 8010 | 90% | 1.11 | 2.4 | 0.05 | 0.73 |
| 2 | 7020 | 91% | 1.12 | 4.3 | 0.18 | 0.95 |
| 3 | 6350 | 92% | 1.14 | 8.6 | 0.27 | 1.2 |
| 4 | 5750 | 93% | 1.18 | 12.2 | 0.82 | 1.52 |
| 5 (COMP. 52) | 4990 | 94% | 1.22 | 19.6 | 1.35 | 2.48 |
| 6 (COMP. 53) | 4010 | 94% | 1.14 | 26.5 | 1.42 | 3.62 |
| 7 (COMP. 54) | 3020 | 96% | 1.26 | 41.5 | 1.83 | 4.85 |
| 8 (COMP. 55) | 5370 | 85% | 1.09 | 14.5 | 1.35 | 3.12 |
| 9 (COMP. 56) | 6020 | 82% | 1.09 | 8.9 | 1.26 | 3.05 |

In order to elucidate the influences of the property of each lubricant and the reliability of slidableness thereof on the basis of the result of Table 12, a change in the maximum abrasion depth in the surface of each magnetic disk with respect to its numeric average molecular weight was analyzed.

Figure 8:
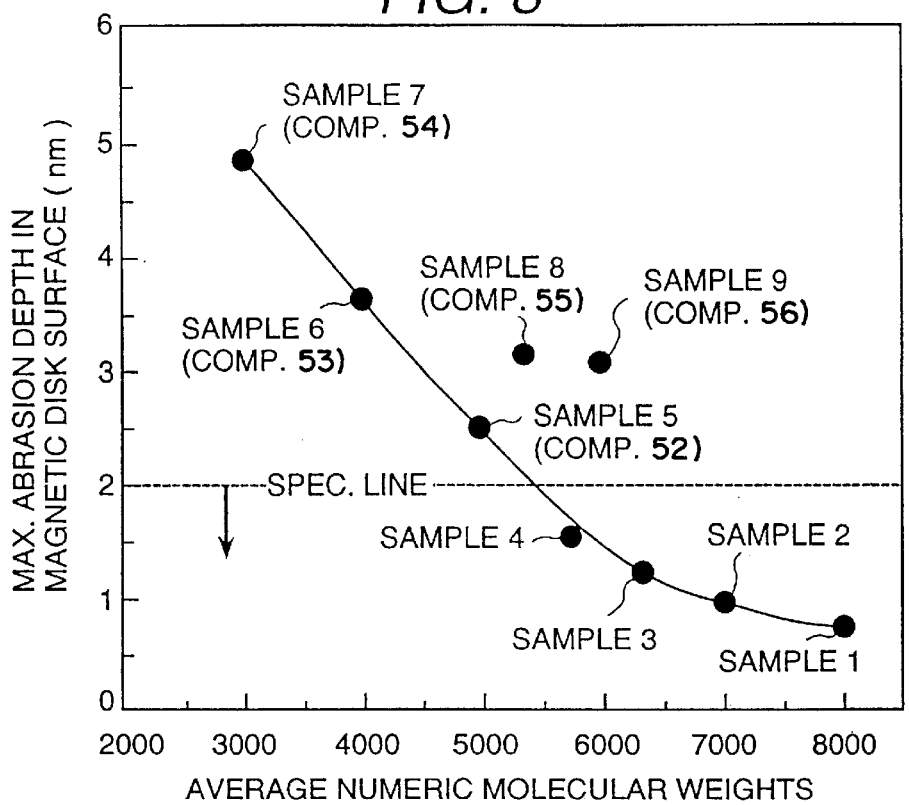
FIG. 8 is a graph indicating a relationship between numeric average molecular weights and maximum abrasion depths in the magnetic disk surface according to embodiment 13 of the invention.

FIG. 8 shows changes in the maximum abrasion depths in the surface of the magnetic disk relative to numeric average molecular weights. When we plotted by a curve the maximum abrasion depths in the surface of the magnetic disk for the instant embodiments (specimens 1–4) of the invention and the comparison examples 53, 54 (specimens 6, 7), all of which were treated by the same ultrafiltration method for controlling molecular weights, it appears that at a numeric average molecular weight in excess of 5500, the maximum abrasion depth in the surface of the magnetic disk tends to become 2 nm or less. Further, the result of comparison example 52 (specimen 5), which was the starting (raw) material, is located on this curve. However, comparison example 56 (specimen 9), notwithstanding the fact that its numeric average molecular weight is larger than that of specimen 4 of the instant embodiment of the invention, showed its maximum abrasion depth in the surface of the magnetic disk to be larger than 2 nm, thereby deviating from the curve of the instant embodiment of the invention (specimens 1–4) and comparison examples 52–54. Further, comparison example 55 showed the same result as above. This is considered to be due to a difference in the control methods for controlling lubricant' molecular weights that influenced the substitution ratio of the functional group at the end-group. At least from the result of FIG. 8, it can be concluded that among the lubricants the molecular weights of which were controlled by the ultrafiltration method, the specimens 1–4 of the instant embodiment of the invention the molecular weight of which was controlled to have a numeric average molecular weight not less than 5500 were ensured to have a maximum abrasion depth in the surface of the magnetic disk which is smaller than 2 nm, and thereby ensuring a reliable slidableness.

Figure 9:
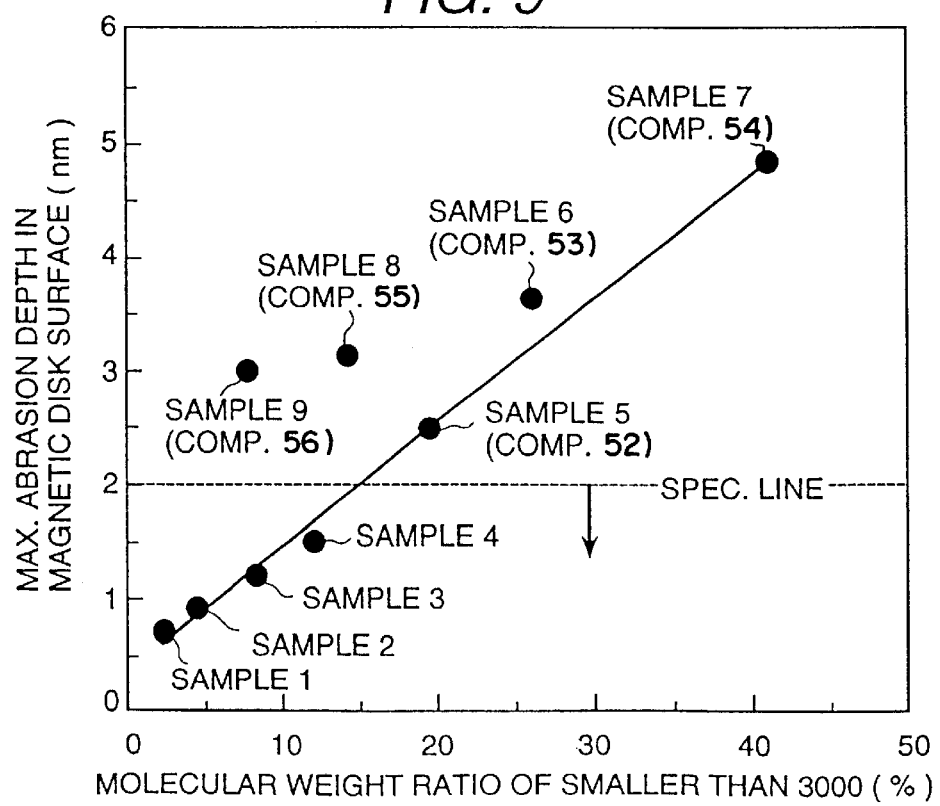
FIG. 9 is a graph indicating a relationship between ratios of molecular weights less than 3000 and maximum abrasion depths in the surface of the disk.

Then, a change in maximum abrasion depths in the surface of the magnetic disk relative to a ratio of magnetic weight smaller than 3000 was analyzed. FIG. 9 shows its result. Likewise in the case of FIG. 8, when we plotted by a curve only maximum abrasion depths in the surface of the magnetic disk obtained for specimens 1–4 of the instant embodiment of the invention and comparison examples 53, 54 (specimens 6, 7), all of which were treated by the same ultrafiltration method for controlling their molecular weights, there appears to exist a tendency for the maximum abrasion depth in the surface of the magnetic disk to become less than 2 nm when a molecular weight less than 3000 exists less than 15 wt. %. Further, the result of comparison example 52 (corresponds to specimen 5), which is the starting (raw) material, is positioned on this curve. However, as for comparison examples 55, 56, notwithstanding the fact that their molecular weight less than 3000 existed less than 15 wt. %, the maximum abrasion depth in the surface of the magnetic disk has shown to be not less than 2 nm, thereby deviating from the curve of the instant embodiment (specimens 1–4) of the invention and comparison examples 53, 54. From the result of FIG. 9, it can be concluded that the specimens 1–4 according to the instant embodiment of the invention, in which the lubricant was treated by the ultrafiltration method for controlling its molecular weights, and a component of molecular weight less than 3000 existed less than 15 wt. %, are advantageous in that the maximum abrasion depth in the surface of the magnetic disk becomes smaller than 2 nm, thus ensuring a reliable slidableness.

Figure 10:
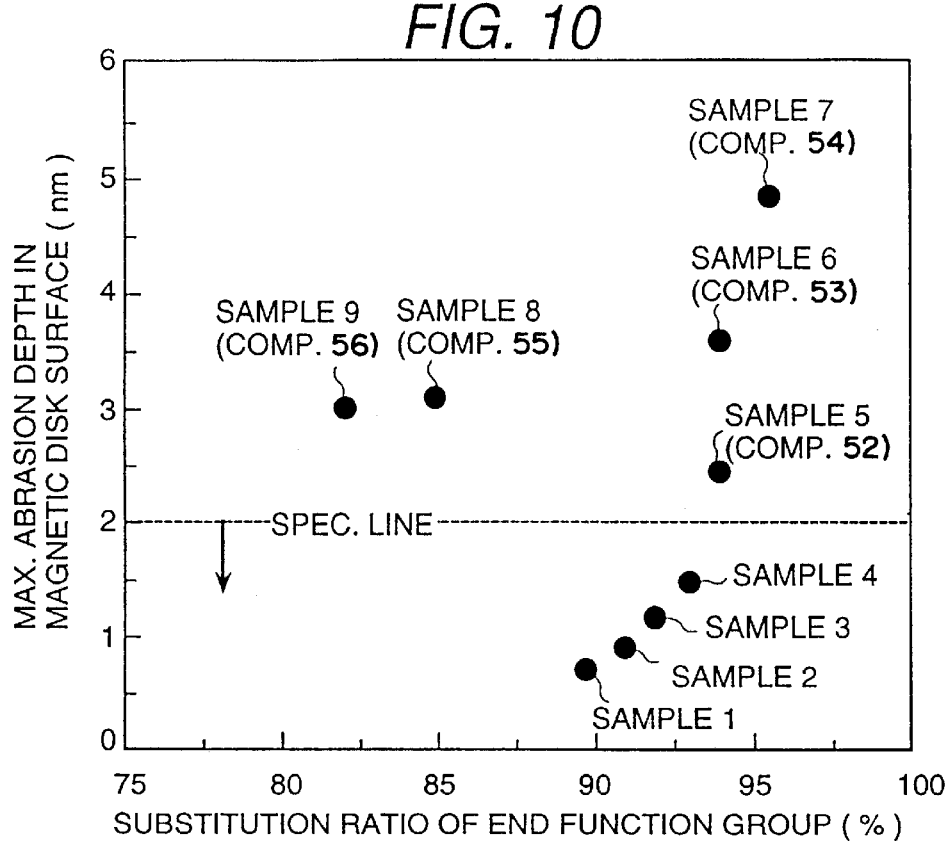
FIG. 10 is a graph indicating a relationship between substitution ratios of terminal functional group and maximum abrasion depths in a disk surface according to embodiment 13 of the invention.

Then, on the basis of the result of Table 12, a change in the maximum abrasion depths in the surface of the magnetic disk relative to a substitution ratio of the functional group at the end group was analyzed. FIG. 10 shows a result of analysis. From the result of FIG. 10, there appears to be no clear correlation between the substitution ratio of the functional group at the end group and the maximum abrasion depth in the surface of the magnetic disk. However, as for comparison example 55, although its numeric average molecular weight is less than 5500, a component of its molecular weight less than 3000 is less than 15 wt. %. As for comparison example 56, its numeric average molecular weight was not less than 5500, but a component of its molecular weight less than 3000 is 15 wt. %. Namely, from the viewpoint on the basis of the property of the lubricants of specimens 1–4 according to the instant embodiment of the invention that were treated by the ultrafiltration method for controlling their molecular weights, the comparison example 56 satisfies at least the requirement for the numeric average molecular weight to be not less than 5500. As for the requirement for the molecular weight less than 3000 to be 15 wt. % or less, both comparison examples 55, 56 satisfy the requirement.

However, as for comparison examples 55 and 56, their maximum abrasion depths in the surface of the magnetic disk are not less than 2 nm. A clear difference in the property of lubricants between the specimens 1–4 of the instant embodiment of the invention and the comparison examples 55, 56 resides in their substitution ratios of the functional group at the end-group, while in the comparison examples 55 and 56, their substitution ratios of the end-group's functional group are less than 90%, in specimens 1–4 of the instant embodiment of the invention, they are more than 90%. The fact that when the molecular weight control of the lubricant was done by the solvent extraction method, its substitution ratio of the end-group's functional group dropped lower than that of the ultrafiltration method is also indicated in embodiment 12 of the invention. It is known from the result of FIG. 10 that there are some although the substitution ratio of the terminal functional group of which are not less than 90%, their maximum abrasion depths in the surface of the magnetic disk become more than 2 nm (comparison examples 52–54). As it is clearly known from the results of FIGS. 8 and 9, this is because that they did not satisfy at least one of the conditions required therefor that the numeric average molecular weight is not less than 5500 and/or the molecular weight less than 3000 is 15 wt. % or less. Namely, it is due to a property of a factor other than the substitution ratio of the terminal functional group that cannot satisfy the requirement for the maximum abrasion depth in the surface of the magnetic disk to be less than 2 nm. From the above, in order to realize for the maximum abrasion depth in the magnetic disk surface to be less than 2 nm, it is required at least for the substitution ratio of the terminal functional group to be not less than 90%. In the lubricants according to the embodiments of the invention, because the substitution ratio of the terminal functional group is not less than 90%, a non-polarity component of the lubricant that is easy to scatter is smaller than in comparison examples 55 and 56, thereby providing for a magnetic disk featuring a highly reliable slidableness with the maximum abrasion depth in the surface of the magnetic disk reduced by 1.5 nm or more. Further, as for the reduced film thickness, reflecting the result of the maximum abrasion depth in the surface of the magnetic disk, specimens 1–4 of the embodiment of the invention showed smaller values in the reduced film thickness than those of comparison examples 52–56. Namely, the instant embodiment of the invention is concluded to provide for a magnetic disk that can ensure a highly reliable slidability to be maintained for a longer period of time of its service life than the comparison examples.

From the above analysis of the results of the instant embodiment of the invention and comparison examples 52–56, it is concluded that the requirements for the lubricant in order to make the maximum abrasion depth in the surface of the magnetic disk to be less than 2 nm, the numeric average molecular weight must be not less than 5500, the molecular weight less than 3000 must be less than 15 wt. %, the substitution ratio of the terminal functional group must be not less than 90%, and the molecular eights must be controlled by the ultrafiltration method. Thereby, according to the instant embodiment of the invention, the maximum abrasion depth in the surface of the magnetic disk was reduced at least by 0.9 nm than in comparison examples 52–56, the reduced film thickness was about ⅔ or less of the comparison examples, and the splash of the lubricant due to a shearing force by air at a high speed rotation and/or the temperature rise in the equipment is minimized, thereby capable of providing a magnetic disk featuring a highly reliable slidableness.

EMBODIMENT 14

A Magnetic Disk Apparatus of Type (A) Using a Lubricant of Structural Formula (2)

A magnetic disk apparatus according to embodiment 14 of the invention is a magnetic disk apparatus of type (A) similar to that of the embodiment 7 of the invention (refer to FIG. 3). However, the disk mounted in this magnetic disk apparatus has the following specification: disk speed of 15000 rpm, record density of 0.025 Gb/mm$^2$, data transfer speed of 77 MB/sec., and of type (a) magnetic disk 29 similar to those mounted in embodiment 13 of the invention and comparison examples 57–61.

In the same conditions as in embodiment 13 of the invention, i.e., at the speed of 18000 rpm and 65° C., a series of load/unload tests of magnetic head slider 21 was repeated. In the first step, magnetic head slider 21 is loaded on the surface of the magnetic disk 29 during its acceleration to execute a random seek. for 7 sec. Then, magnetic head slider 21 is unloaded out of the plane of the disk in the periphery thereof to be held for one second therein. This series of operations was repeated. A speed of rotation of magnetic disk 25 in a state in which magnetic head slider 29 is completely loaded on the surface of magnetic disk 25 and executing a seek operation is 18000 rpm. In this embodiment of the invention, a time until occurrence of abnormality in the load/unload operation was measured. The measurement was carried out up to 1000 hours maximum, and stopped its measurement at 1000 hours for specimens that showed no abnormal operation. Here, the abnormal load/unload operations refers to a state in which the head is unable to load or unload stably. The reason for this abnormal operation is due to adsorption between the head slider and the disk and/or abrasions of the disk and the head slider. The result of the instant embodiment of the invention reflects the advantage (effect) of the lubricant according to the invention. Table 13 shows their results.

TABLE 13

| UNITS | SAMPLES | NUM. AVER. MOL. WEIGHT | SUB. RATIO OF END FUNC. GROUP | MOL. WEIGHT DISTR. MW/MN | RATIO OF MOL. WT. LESS THAN 3000 (%) | MEAN TIME TO ABNORMALITY IN LOAD/UNLOAD OPERATION. |
|---|---|---|---|---|---|---|
| 1 | 1 | 8010 | 90% | 1.11 | 2.4 | NO (1,000H≦) |
| 2 | 2 | 7020 | 91% | 1.12 | 4.3 | NO (1,000H≦) |
| 3 | 3 | 6350 | 92% | 1.14 | 8.6 | NO (1,000H≦) |
| 4 | 4 | 5750 | 93% | 1.18 | 12.2 | NO (1,000H≦) |

TABLE 13-continued

| UNITS | SAMPLES | NUM. AVER. MOL. WEIGHT | SUB. RATIO OF END FUNC. GROUP | MOL. WEIGHT DISTR. MW/MN | RATIO OF MOL. WT. LESS THAN 3000 (%) | MEAN TIME TO ABNORMALITY IN LOAD/UNLOAD OPERATION. |
|---|---|---|---|---|---|---|
| 5 | 5 (COMP. 57) | 4990 | 94% | 1.22 | 19.6 | 843H (NO UNLOADING) |
| 6 | 6 (COMP. 58) | 4010 | 94% | 1.14 | 26.5 | 685H (NO UNLOADING) |
| 7 | 7 (COMP. 59) | 3020 | 96% | 1.26 | 41.5 | 216H (NO LOADING DUE TO DISK CRASH) |
| 8 | 8 (COMP. 60) | 5370 | 85% | 1.09 | 14.5 | 584H (NO UNLOADING) |
| 9 | 9 (COMP. 61) | 6020 | 82% | 1.09 | 8.9 | 456H (NO UNLOADING) |

In all of comparison examples 57–61 (specimens 5–9), load/unload abnormal operation occurred within 1000 hours form the start of tests. In contrast, in the specimens 1–4 according to the invention, no load/unload abnormal operation took place after elapse of 1000 hours from the start of the test, and continued a stable operation. Namely, it may be concluded that a preferred property of the lubricant (such as by the instant embodiment) for ensuring the magnetic disk apparatus to maintain its stable and normal operation is to have the numeric average molecular weight controlled to be not less than 5500, the molecular weight less than 3000 controlled to be less than 15 wt. %, the substitution ratio of the terminal functional group controlled to be not less than 90%, and their molecular weights controlled by the ultrafiltration method. The above result shows the same tendency as that of embodiment 13 of the invention.

Therefore, if the molecular weight is controlled by means of the ultrafiltration method such that its numeric average molecular weight becomes not less than 5500, its molecular weight less than 3000 becomes 15 wt. % or less, and the substitution ratio of its terminal functional group becomes not less than 90%, a stable operation of the magnetic disk apparatus throughout load/unload operation can be maintained.

EMBODIMENT 15

Magnetic Disk of Type (b) Using the Lubricant of Structural Formula (2)

A magnetic disk according to embodiment 15 of the invention is a magnetic disk of type (b) coated with the lubricant manufactured according to embodiment 12 of the invention. A perfluoropolyether lubricant having structural formula (2) was coated by dipping to a thickness of about 2 nm. The same evaluation was applied to this magnetic disk of the instant embodiment of the invention as done to the embodiment 1 of the invention. The results of measurements obtained for respective lubricants of specimens 1–4 according to the invention and specimens 5–9 of comparison examples 62–66 are indicated in Table 14.

In the same manner as in embodiment 13 of the invention, the magnetic disk is mounted on the pin-on-disk type abrasion measurement unit and subjected to a continual operation at 65° C. for 1000 hours. Then, a quantity of abrasion in a laser zone in the surface of the disk, a sticktion between the head and the disk, and a reduced film thickness from its initial film thickness were measured, respectively. The magnetic disk was rotated up to 18000 rpm, and with the head in a state of floating, a random seek was executed for

TABLE 14

| SAMPLES | NUM. AVER. MOL. WEIGHT | SUB. RATIO OF END FUNC. GROUP | MOL. WEIGHT DISTR. MW/MN | RATIO OF MOL. WT. LESS THAN 3000 (%) | STICKTION (GH) | QTY OF ABRASION OF BUMPS (NM) | REDUCED FILM THICKNESS (NM) |
|---|---|---|---|---|---|---|---|
| 1 | 8010 | 90% | 1.11 | 2.4 | 3.10 | 1.75 | 0.06 |
| 2 | 7020 | 91% | 1.12 | 4.3 | 2.56 | 1.56 | 0.16 |
| 3 | 6350 | 92% | 1.14 | 8.6 | 1.79 | 1.68 | 0.46 |
| 4 | 5750 | 93% | 1.18 | 12.2 | 3.34 | 1.55 | 0.76 |
| 5 (COMP. 62) | 4990 | 94% | 1.22 | 19.6 | 4.87 | 4.27 | 1.33 |
| 6 (COMP. 63) | 4010 | 94% | 1.14 | 26.5 | 5.95 | 4.96 | 1.53 |
| 7 (COMP. 64) | 3020 | 96% | 1.26 | 41.5 | 6.42 | 5.23 | 1.74 |
| 8 (COMP. 65) | 5370 | 85% | 1.09 | 14.5 | 7.06 | 6.22 | 1.34 |
| 9 (COMP. 66) | 6020 | 82% | 1.09 | 8.9 | 6.34 | 6.13 | 1.32 |

3 second, then, the disk rotation was stopped. During deceleration of the disk, the head in seek operation over a data zone, returns to the laser zone. During stoppage of the disk, the head stands by over the laser zone in contact with the disk. After about 1 second stoppage, the disk resumes its rotation, and the head executes random seek over the data zone. This series of operation was repeated. During disk starting and stopping, the head undergoes a contact-start-stop (CSS) operation on the laser zone. Because the laser zone is always subjected to the contact-start-stop operation at the times of disk start and stoppage, its sliding condition becomes very severe. Therefore, in this embodiment of the invention, a quantity of abrasion in the laser zone in which the sliding condition becomes most severe was measured. A quantity of abrasion in the bumps in the laser zone was measured using an atomic force microscope (AFM). The results of evaluation on specimens 1–4 according to the invention and specimens 5–9 according to comparison examples 62–66 are shown in Table 14.

Figure 11:
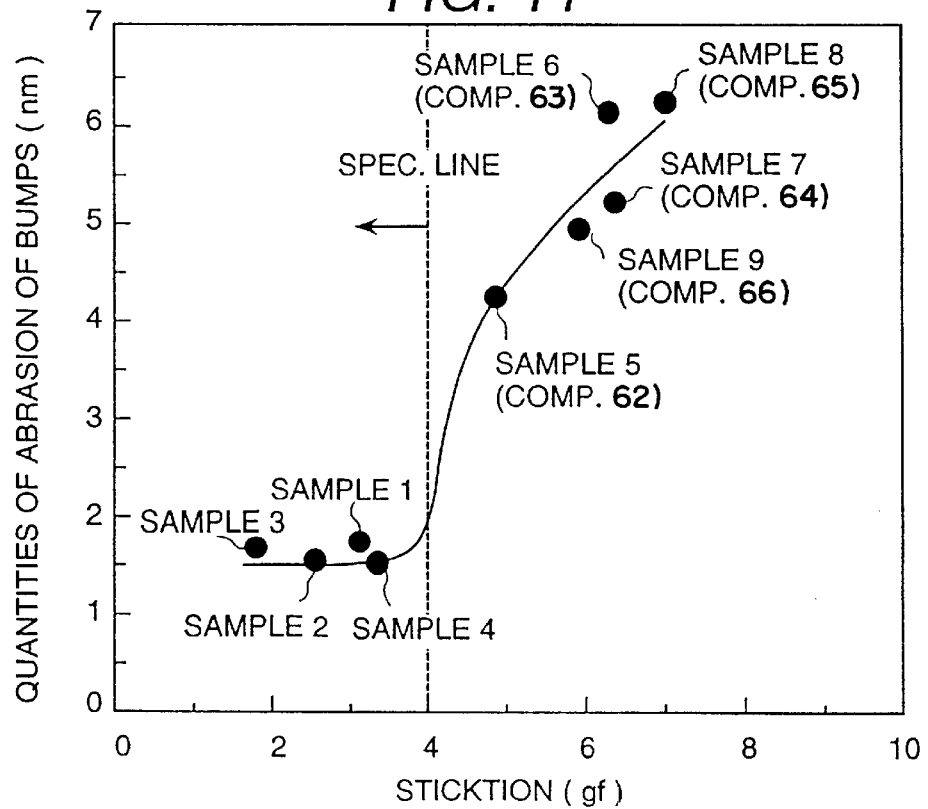
FIG. 11 is a graph indicating a relationship between sticktion (sticking) and amounts of abrasion of bumps according to embodiment 15 of the invention.

On the basis of the result of Table 14, a relationship between the sticktion and quantities of abrasion of the bumps is assessed as shown in FIG. 11. Specimens 1–4 according to the instant embodiment of the invention, in which sticktion is below 4.0 gf, quantities of abrasion of the bumps are less than 4 nm. In contrast, in all of comparison examples 62–66, quantities of abrasion in their bumps are not less than 4 nm, thus indicating that there exists a clear correlation between sticktion and the quantity of abrasion in the bumps. Sticktion occurs also in such a case where a lot of lubricant congregates between the head and the disk, in this case, a change in coarseness of the disk is not a direct cause of its sticktion. Namely, sticktion evaluated in this embodiment of the invention does not reflect the easiness of congregation of the lubricant between the head and the disk, but reflects a significant level of difference caused by a reduced coarseness in the laser zone due to the abrasion of the bumps. Therefore, the sticktion in this embodiment of the invention correlates with the effect by anti-abrasion of the lubricant. From the result of FIG. 11, in order to make sticktion smaller than 4.0 gf, it is known that the quantity of abrasion of the bumps must be controlled smaller than 4 nm.

Figure 12:
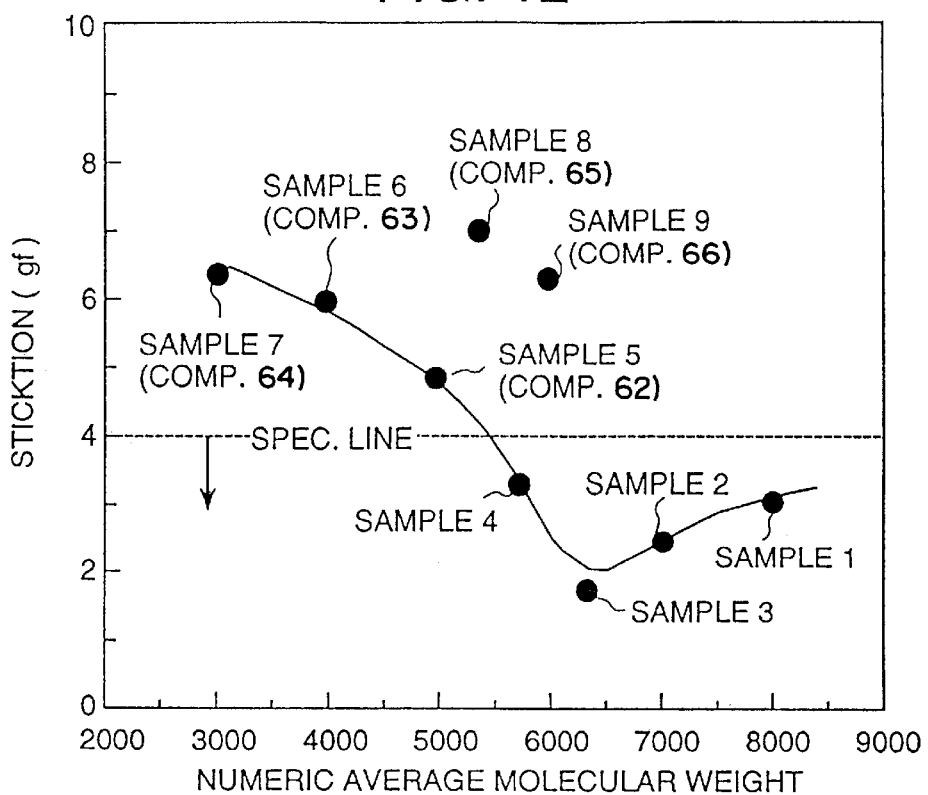
FIG. 12 is a graph indicating a relationship between numerical average molecular weights and sticktion according to embodiment 15 of the invention.

In order to elucidate influences by the property of each lubricant and reliability in its slide operation in the magnetic disk from the result of Table 14 according to the invention, as a first step, a change of sticktion relative to a numeric average molecular weight is assessed. FIG. 12 indicates changes of sticktion relative to changes in numeric average molecular weights. Results of sticktion obtained fro the specimens 1–4 of the instant embodiment of the invention and the specimens 6, 7 of comparison examples, 63, 64, the molecular weights of all of the above are controlled by the same ultrafiltration method, are plotted by a curve. It is known from the curve that for numeric average molecular weights not less than 5500, sticktion becomes below 4.0 gf. Further, the result of comparison example 62 (specimen 5) that is the staring material is positioned on this cured. However, as for comparison example 66, notwithstanding that its numeric average molecular weight is larger than that of specimen 4 of the instant embodiment of the invention, its stricktion is depicted to be greater than 4.0 gf, and deviates from the curve of specimens 14 of the instant embodiment of the invention and comparison examples 62–64. Also, comparison example 65 (specimen 8) indicates the same result as above. This is considered to be due to their different methods fro controlling molecular weights of the lubricant that caused a different substitution ratio of the terminal functional group that influenced their results.

At least from the result of FIG. 12, it is known that, among those the molecular weights of which lubricants are controlled by the ultrafiltration method, specimens 1–4 of the embodiment of the invention the molecular weights of which are controlled such that the numeric average molecular weight thereof becomes not less than 5500, have its sticktion to be below 4.0 gf, thereby ensuring a reliable slidableness to be maintained.

Figure 13:
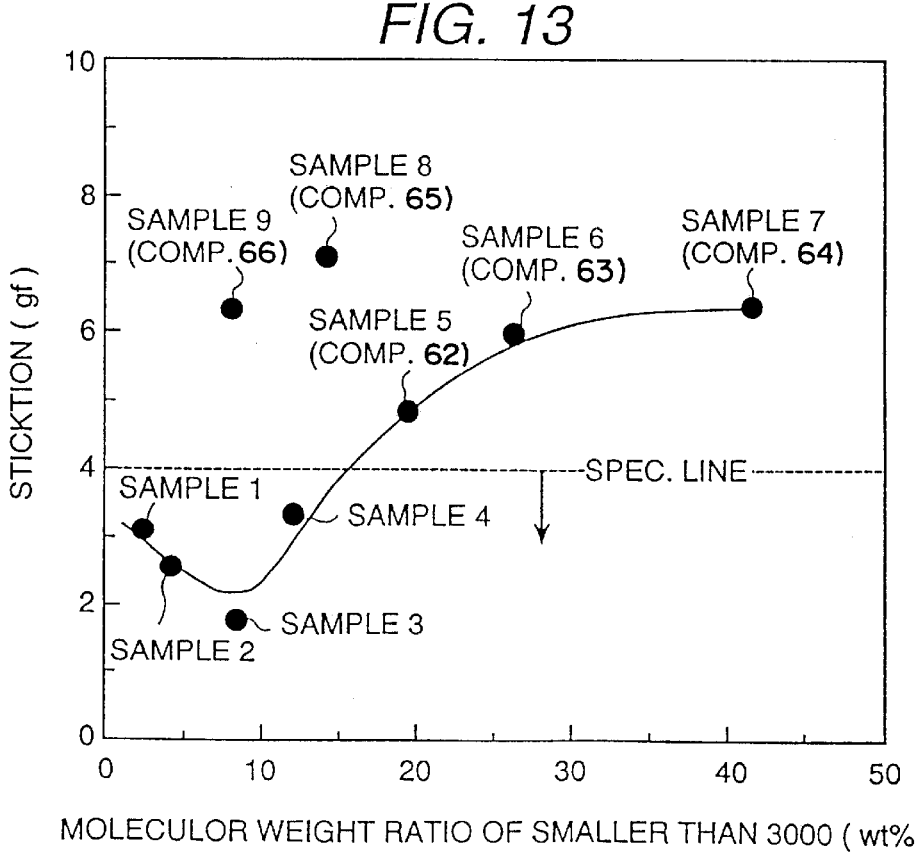
FIG. 13 is a graph indicating a relationship between ratios of molecular weights less than 3000 and sticktion according to embodiment 15 of the invention.

In the next, changes in sticktion relative to a ratio of molecular weights less than 3000 were assessed on the basis of the result of Table 14. FIG. 13 shows a result of assessment. Likewise in the case of FIG. 12, results of sticktion in specimens 1–4 according to the instant embodiment of the invention and specimens 6, 7 of comparison examples 63, 64, all of which were treated by the same ultrafiltration method for controlling their molecular weights are plotted by a curve. It is known from this curve that when its molecular weight less than 3000 becomes smaller than 15 wt. %, its sticktion becomes below 4.0 gf. Further, a result of comparison example 62, which is the starting (raw) material, is positioned on this curve. However, as for comparison examples 65, 66 (specimens 8, 9), notwithstanding that their molecular weight less than 3000 is below 15 wt. %, their result of sticktion is not less than 4.0 gf, deviating from the curve of specimens 1–4 according to the invention and comparison examples 63 and 64. Also, from Table 14, it is known that the quantity of abrasion of their bumps is not less than 4 nm. This is considered to be due to the influence by the substitution ratio of the terminal functional group caused by the different methods of controlling molecular weights of their lubricant as described above.

At least from the result of FIG. 13, it may be concluded that among those specimens that are treated by the ultrafiltration method, specimens 1–4 according to this instant embodiment of the invention the molecular weights of which are controlled such that the component of molecular weights less than 3000 becomes smaller than 15 wt. % have a reduced sticktion that is less than 4.0 gf, thereby ensuring a reliable slidableness to be maintained.

Figure 14:
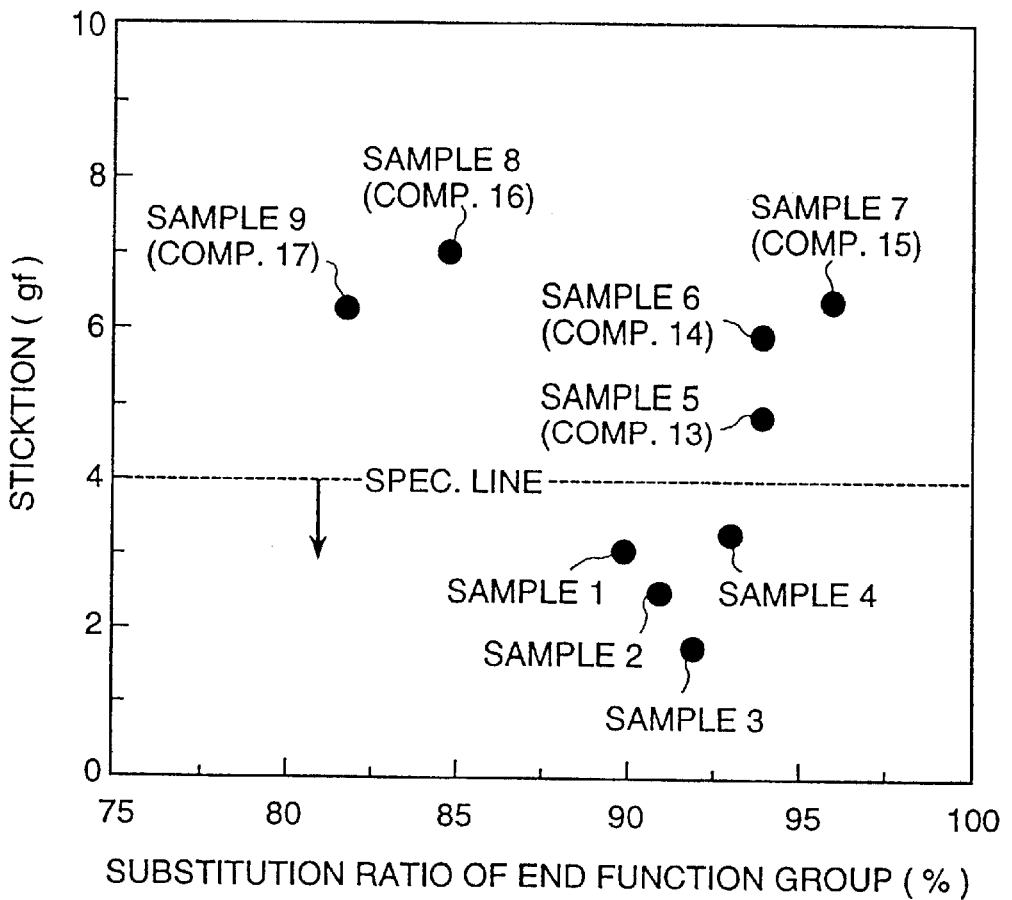
FIG. 14 is a graph indicating a relationship between substitution ratios of terminal functional groups and sticktion according to embodiment 15 of the invention.

In the next, changes of the maximum abrasion depth in the surface of the magnetic disk relative to the substitution ratio of the terminal functional group were analyzed on the basis of the result of Table 14. FIG. 14 shows the result of analysis. Likewise the case of embodiment 13 of the invention, there appears to be no definite correlation between the substitution ratio of the terminal functional group and the sticktion from the result of FIG. 14. As for comparison example 65, its numeric average molecular weight is smaller than 5500 and its molecular weight less than 3000 is smaller than 15 wt. %. Further, as for comparison example 66, its numeric average molecular weight is not less than 5500 and its molecular weight less than 3000 is smaller than 15 wt. %. Namely, in terms of the numeric average molecular weight of the lubricant obtained by the instant embodiment of the invention (specimens 1–4) the molecular weights of which are controlled using the ultrafiltration method, the comparison example 66 satisfies the requirement for the numeric average molecular weight that is to be not less than 5500. Further, as to the requirement that the molecular weight less than 3000 is to be smaller than 15 wt. %, both the comparison examples 65 and 66 satisfy this condition. Notwithstanding the above, sticktions of comparison examples 65 and 66 are not les than 4.0 gf. A clear difference in the properties of lubricants between the comparison examples 65, 66 and the instant embodiment of the invention (specimens 14) resides in their substitution ratios of the terminal functional. groups, i.e., while in comparison examples 65, 66 their substitution ratios of the terminal functional group are smaller than 90%, substitution ratios of the terminal functional group in the instant embodiment of the invention (specimens 14) are not less than 90%. The fact that, in the case where molecular weights of the lubricant are controlled by the solvent extraction method, the substitution ratio of the terminal functional group will drop lower than that by the ultrafiltration method, is also described in the embodiment 12 of the invention. In the result of FIG. 14, there are included such examples in which although their substitution ratio of the terminal functional group is not less than 90%, their sticktion becomes not less than 4.0 gf (i.e., comparison examples 62–64). This is because that, as is clearly known from the results of FIGS. 12 and 13, they do not satisfy at least one of the requirements that the average molecular weight is not less than 5500 and the molecular weight less than 3000 is smaller than 15 wt. %. Namely, they are deficient in their property other than the substitution ratio of the terminal functional group of the lubricant such that they cannot satisfy the requirement for its sticktion being smaller than 4.0 gf. From the above, it can be concluded that in order to realize for its sticktion to be smaller than 4.0 gf, at least the substitution ratio of the terminal functional group must be not less than 90%. The lubricant according to this embodiment of the invention, in which the substitution ratio of the terminal functional group is controlled to be not less than 90%, has minimized the presence of the non-polarity lubricant component that is easily scattered in comparison with the comparison examples 65 and 66, thereby allowing to provide for a magnetic disk having an excellent reliability in slidableness with its sticktion reduced lower than one half of the conventional art. Further, as to the reduced film thickness, reflecting the effects on the sticktion and the quantity of abrasion of the bumps, its reduced film thickness of the instant embodiment of the invention (specimens 1–4) is smaller than that of comparison examples 62–66. Therefore, the magnetic disk according to this instant embodiment of the invention can maintain its reliable slidableness for a longer service life.

As described above, the requirements for the lubricant in order to ensure for its sticktion to be smaller than 4,0 gf are that the numeric average molecular weight is to be not less than 5500, the molecular weight less than 3000 is to be smaller than 15 wt. %, the substitution ratio of the terminal functional group is not less than 90%, and the molecular weights are to be controlled by the ultra-filtration method. Thereby, according to the instant embodiment of the invention, an excellent magnetic disk having a highly reliable slidableness is provided, featuring that its sticktion is reduced at least by 1.5 gf than those of comparison examples 62–66, its quantity of abrasion of the bumps is about 2/5 thereof, its reduced film thickness is less than one half thereof, and its splash of the lubricant due to the shearing force by air at a high speed more than 10000 rpm or due to the temperature rise in the apparatus is minimized.

EMBODIMENT 16

A Magnetic Disk Apparatus of Type (B) Using a Lubricant Having Structural Formula (2).

A magnetic disk apparatus according to this embodiment of the invention is the same magnetic disk apparatus of type (B) as the embodiment 3 of the invention (see FIG. 5). However, this magnetic disk apparatus of this embodiment 16 of the invention has the following specification: a disk speed of 10000 rpm, a recording density of 0.011 $Gb/mm^2$, a data transfer speed of 55 MB/sec., and its magnetic disk mounted being of type (b) according to embodiment 15 of the invention.

In the magnetic disk apparatus according to this embodiment of the invention, during disk rotation, its magnetic head slider floats on the data zone, and during disk stoppage, the magnetic head slider is evacuated on the laser zone, therefore, it is necessary to take into account the sticktion between the magnetic head slider and the disk at the time of starting the disk. Assurance of slider reliability of the magnetic disk apparatus in this embodiment of the invention refers to a low sticktion in the laser zone. The performance of the lubricant determines the slider reliability between the head/disk, and in particular, the slider endurance in the laser zone, therefore, it is one of the most important factors for accomplishing the function required as the apparatus.

For evaluation of the embodiment of the invention, an accelerated test for evaluation was executed in order to confirm the effect and advantage according to the invention (as a magnetic disk apparatus) in a short period of time. Seek & CSS (Contact-Start-Stop) tests were carried out at a speed of 18000 rpm and 65° C. At first, the magnetic disk starts its rotation and the magnetic head slider standing by on the laser zone in contact therewith is floated. In the next, after the magnetic head slider executes a random seek on the data zone for 7 seconds, the magnetic disk is stopped. Until the disk stops its rotation on the laser zone. During this period of time, the magnetic head slider 21 is caused to make slide contact on the laser zone. After the magnetic head slider is held in a slide contact state on the laser zone for one second, the disk is caused to resume its rotation. This series of operation was repeated. The speed of rotation of the magnetic disk in a state when the magnetic head slider 21 is in a complete float and seek operation is 18000 rpm. The magnetic disk apparatus of this embodiment of the invention is provided with a mechanism for forcibly vibrating the magnetic head slider to release a strong sticktion if it occurs between the magnetic head slider and the magnetic disk such that it prevents the disk rotation. This sticktion release mechanism is actuated when its sticktion per plane of the disk exceeds 4.0 g. In the evaluation of this embodiment of the invention, the above-mentioned series of the seek & CSS (Contact-Start-Stop) tests were carried out for 1000 hours, left as it were for 6 hours, then the operation was resumed to confirm if the sticktion release mechanism is activated or not. The result of the evaluation is shown in Table 15.

TABLE 15

| UNITS | SAMPLES | NUM. AVER. MOL. WEIGHT | SUB. RATIO OF END FUNC. GROUP | MOL. WEIGHT DISTR. MW/MN | RATIO OF MOL. WT. LESS THAN 3000 (%) | STICKTION RELEASE MECHANISM OPERABILITY |
|---|---|---|---|---|---|---|
| 1 | 1 | 8010 | 90% | 1.11 | 2.4 | NG |
| 2 | 2 | 7020 | 91% | 1.12 | 4.3 | NG |
| 3 | 3 | 6350 | 92% | 1.14 | 8.6 | NG |
| 4 | 4 | 5750 | 93% | 1.18 | 12.2 | NG |

TABLE 15-continued

| UNITS | SAMPLES | NUM. AVER. MOL. WEIGHT | SUB. RATIO OF END FUNC. GROUP | MOL. WEIGHT DISTR. MW/MN | RATIO OF MOL. WT. LESS THAN 3000 (%) | STICKTION RELEASE MECHANISM OPERABILITY |
|---|---|---|---|---|---|---|
| 5 | 5 (COMP. 67) | 4990 | 94% | 1.22 | 19.6 | OK |
| 6 | 6 (COMP. 68) | 4010 | 94% | 1.14 | 26.5 | OK |
| 7 | 7 (COMP. 69) | 3020 | 96% | 1.26 | 41.5 | OK |
| 8 | 8 (COMP. 70) | 5370 | 85% | 1.09 | 14.5 | OK |
| 9 | 9 (COMP. 71) | 6020 | 82% | 1.09 | 8.9 | OK |

For all of comparison examples 67–71 (specimens 5–9), the sticktion release mechanism was activated at the time of restarting after each 1000 hour seek & CSS test. That is, it is considered that in comparison examples 67–71, an average sticktion at least not less than 4.0 gf per disk occurred between the head and the disk causing a defect to stop the spindle. In contrast, for specimens 1–4 of the instant embodiment of the invention, the sticktion release mechanism was not activated. This means that an average sticktion per disk between the head and the magnetic disk was smaller than 4.0 gf, and no defect occurred in the apparatus. The reason why the sticktion release mechanism was not activated in this embodiment 16 of the invention is considered to be because that, likewise in the case of embodiment 15 of the invention, splash of the lubricant in this embodiment of the invention was substantially smaller than in comparison examples 67–71, thereby reducing the abrasion of the bumps, and thus ensuring for the coarseness in the laser zone to be maintained.

As described heretofore, according to the instant embodiment of the invention, the molecular weight of the lubricant was controlled by the ultrafiltration method such that its numeric average molecular weight is not less than 5500, its molecular weight that is smaller than 3000 is 15 wt. % or less, and the substitution ratio of its terminal functional group is not less than 90%. Thereby, an excellent magnetic disk has been provided, which eliminates the occurrence of a strong sticktion between the head and the disk, and ensures a stable and reliable operation to be maintained for a prolonged service life.

According to the invention, an excellent information record reproduction medium, magnetic disk, which eliminates splashing of the lubricant, and features an improved property in slidableness, has been obtained. Further, an excellent information record reproduction apparatus and magnetic disk apparatus featuring an excellent record reproduction property and a stable operation for a longer service life have been provided by mounting the above information record reproduction medium and magnetic disk. Still further, according to the lubricant molecular weight control method and the lubricant molecular weight control apparatus of the invention, it has become possible to control the molecular weights of the lubricant and its molecular weight distribution such that the drop in the substitution ratio is minimized to achieve a wider applicability, improvements in the cost of manufacture and productivity. The lubricant of the invention has been described by way of example as such lubricants for use of the magnetic disk, but it is not limited thereto, and it can be applied for use of any other information record medium, for example, a photomagnetic record medium, optical recording medium and the like as well.

What is claimed is:

1. A lubricant for a magnetic disk to be coated thereon, comprising a perfluoropolyether having a following formula (1),

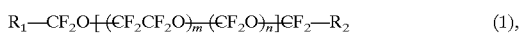

(1), where $R_1$ and $R_2$ are each a univalent organic group, and m and n are each a positive integer, wherein a component of said perfluoropolyether having number average molecular weights less than 1000 is smaller than 10 wt. %, and a component thereof having number average molecular weights not less than 7000 is smaller than 15 wt. %; a ratio between a weight average molecular weight and a number average molecular weight is smaller than 1.5; and a substitution ratio of a terminal functional group that secures an adsorption force of the lubricant is not less than 90%.

2. A lubricant according to claim 1, wherein said perfluoropolyether is either one of the following formulas (2) and (3);

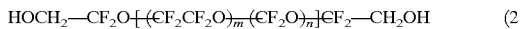

(2)

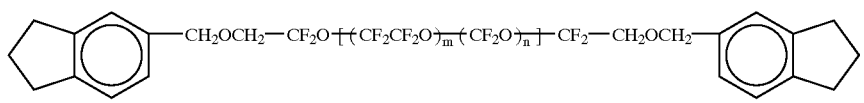

(3)

where m and n are positive integers.

3. A lubricant according to claim 2, wherein said perfluoropolyether has a number average molecular weight that is not less than 2500 and less than 3500.

4. A magnetic disk comprising a lamination formed on a non-magnetic substrate of a magnetic layer for recording information, a protection film formed thereon for protecting said magnetic layer, and a lubrication film formed on said protection film, wherein said lubrication film comprises the lubricant according to claim 2.

5. A magnetic disk apparatus comprising a magnetic disk, a spindle motor for rotating said magnetic disk, a magnetic head slider for recording and reproducing data on and from said magnetic disk, a drive unit for driving said magnetic head slider in the vicinity of a surface of said magnetic disk, and a control unit for controlling said spindle motor and said drive unit, wherein said magnetic disk comprises a magnetic layer formed on a non-magnetic substrate for recording information, a protection film formed thereon for protecting said magnetic layer, and a lubricant film formed on said protection film, and wherein said lubricant film contains the lubricant according to claim 2.

6. A lubricant according to claim 1, wherein said perfluoropolyether has a number average molecular weight that is not less than 2500 and less than 3500.

7. A magnetic disk comprising a lamination formed on a non-magnetic substrate of a magnetic layer for recording information, a protection film formed thereon for protecting said magnetic layer, and a lubrication film formed on said protection film, wherein said lubrication film comprises the lubricant according to claim 1.

8. A magnetic disk apparatus comprising a magnetic disk, a spindle motor for rotating said magnetic disk, a magnetic head slider for recording and reproducing data on and from said magnetic disk, a drive unit for driving said magnetic head slider in the vicinity of a surface of said magnetic disk, and a control unit for controlling said spindle motor and said drive unit, wherein said magnetic disk comprises a magnetic layer formed on a non-magnetic substrate for recording information, a protection film formed thereon for protecting said magnetic layer, and a lubricant film formed on said protection film, and wherein said lubricant film contains the lubricant according to claim 1.

9. A lubricant for a magnetic disk to be coated thereon, comprising a perfluoropolyether having a following formula (1),

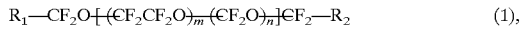

$$R_1\text{—}CF_2O\text{—}[(CF_2CF_2O)_m\text{—}(CF_2O)_n]\text{—}CF_2\text{—}R_2 \quad (1),$$

where $R_1$ and $R_2$ are each a univalent organic group, and m and n are each a positive integer, wherein a component of said perfluoropolyether is controlled by ultra-filtration method so that a component of said perfluoropolyether having number average molecular weights less than 1000 is smaller than 10 wt. %, and a component thereof having number average molecular weights not less than 7000 is smaller than 15 wt. %; a ratio between a weight average molecular weight and a number average molecular weight is smaller than 1.5; and a substitution ratio of a terminal functional group that secures an adsorption force of the lubricant is not less than 90%.

10. A lubricant according to claim 9, wherein said perfluoropolyether is either one of the following formulas (2) and (3);

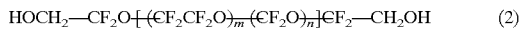

$$HOCH_2\text{—}CF_2O\text{—}[(CF_2CF_2O)_m\text{—}(CF_2O)_n]\text{—}CF_2\text{—}CH_2OH \quad (2)$$

11. A lubricant according to claim 10, wherein said perfluoropolyether has a number average molecular weight that is not less than 2500 and less than 3500.

12. A magnetic disk comprising a lamination formed on a non-magnetic substrate of a magnetic layer for recording information, a protection film formed thereon for protecting said magnetic layer, and a lubrication film formed on said protection film, wherein said lubrication film comprises the lubricant according to claim 11.

13. A magnetic disk apparatus comprising a magnetic disk, a spindle motor for rotating said magnetic disk, a magnetic head slider for recording and reproducing data on and from said magnetic disk, a drive unit for driving said magnetic head slider in the vicinity of a surface of said magnetic disk, and a control unit for controlling said spindle motor and said drive unit, wherein said magnetic disk comprises a magnetic layer formed on a non-magnetic substrate for recording information, a protection film formed thereon for protecting said magnetic layer, and a lubricant film formed on said protection film, and wherein said lubricant film contains the lubricant according to claim 11.

14. A lubricant according to claim 9, wherein said perfluoropolyether has a number average molecular weight that is not less than 2500 and less than 3500.

15. A magnetic disk comprising a lamination formed on a non-magnetic substrate of a magnetic layer for recording information, a protection film formed thereon for protecting said magnetic layer, and a lubrication film formed on said protection film, wherein said lubrication film comprises the lubricant according to claim 9.

16. A magnetic disk apparatus comprising a magnetic disk, a spindle motor for rotating said magnetic disk, a magnetic head slider for recording and reproducing data on and from said magnetic disk, a drive unit for driving said magnetic head slider in the vicinity of a surface of said magnetic disk, and a control unit for controlling said spindle motor and said drive unit, wherein said magnetic disk comprises a magnetic layer formed on a non-magnetic substrate for recording information, a protection film formed thereon for protecting said magnetic layer, and a lubricant film formed on said protection film, and wherein said lubricant film contains the lubricant according to claim 9.

17. A lubricant for a magnetic disk to be coated thereon, comprising a perfluoropolyether having a following formula (2),

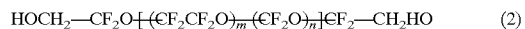

$$HOCH_2\text{—}CF_2O\text{—}[(CF_2CF_2O)_m\text{—}(CF_2O)_n]\text{—}CF_2\text{—}CH_2HO \quad (2)$$

where m and n are positive integers, wherein a number average molecular weight of said perfluoropolyether is at least 5500, a component of number average molecular weights that is smaller than 3000 is 15 wt. % or less, a ratio between a weight average molecular weight and a number average molecular weight is 1.5 or less, and a substitution ratio of a terminal functional group that secures an adsorption force of the lubricant is not less than 90%.

18. A magnetic disk comprising a magnetic layer formed on a non-magnetic substrate for recording information, a protection film for protecting said magnetic layer, and a

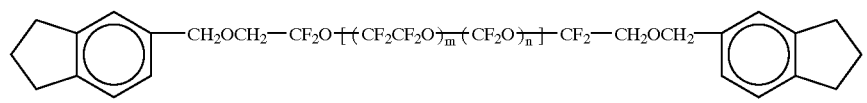

(3)

where m and n are positive integers.

lubrication film formed on said protection film, wherein said lubrication film contains the lubricant according to claim 17.

19. A magnetic disk apparatus comprising a magnetic disk, a spindle motor for rotating said magnetic disk, a magnetic head slider for recording and reproducing data on and from said magnetic disk, a drive unit for driving said magnetic head slider in the vicinity of a surface of said magnetic disk, and a control unit for controlling said spindle motor and said drive unit, wherein said magnetic disk comprises a magnetic layer formed on a non-magnetic substrate for recording information, a protection film formed thereon for protecting said magnetic layer, and a lubricant film formed on said protection film, and wherein said lubricant film contains the lubricant according to claim 17.

20. A lubricant for a magnetic disk to be coated thereon, comprising a perfluoropolyether having a following formula (2),

$$HOCH_2-CF_2O-[(CF_2CF_2O)_m-(CF_2O)_n]-CF_2-CH_2OH \qquad (2)$$

wherein m and n are positive integers, wherein said perfluoropolyether is controlled by ultra-filtration method so that a number average molecular weight of said perfluoropolyether is at least 5500, a component of molecular weights that is smaller than 3000 is 15 wt. % or less, a ratio between a weight average molecular weight and a number average molecular weight is 1.5 or less, and a substitution ratio of a terminal functional group that secures an adsorption force of the lubricant is not less than 90%.

21. A magnetic disk comprising a magnetic layer formed on a non-magnetic substrate for recording information, a protection film for protecting said magnetic layer, and a lubrication film formed on said protection film, wherein said lubrication film contains the lubricant according to claim 20.

22. A magnetic disk apparatus comprising a magnetic disk, a spindle motor for rotating said magnetic disk, a magnetic head slider for recording and reproducing data on and from said magnetic disk, a drive unit for driving said magnetic head slider in the vicinity of a surface of said magnetic disk, and a control unit for controlling said spindle motor and said drive unit, wherein said magnetic disk comprises a magnetic layer formed on a non-magnetic substrate for recording information, a protection film formed thereon for protecting said magnetic layer, and a lubricant film formed on said protection film, and wherein said lubricant film contains the lubricant according to claim 20.

* * * * *